United States Patent
Mulvey et al.

(10) Patent No.: US 6,629,216 B1
(45) Date of Patent: Sep. 30, 2003

(54) FIBRE CHANNEL BY-PASS

(75) Inventors: Christopher J. Mulvey, Shrewsbury; William R. Tuccio, Sutton; Thomas Earl Linnell, Northborough, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/343,344

(22) Filed: Jun. 30, 1999

(51) Int. Cl.$^7$ ............................................. G06F 12/00
(52) U.S. Cl. ..................................... 711/154; 370/357
(58) Field of Search ................................. 710/5, 11, 28, 710/38, 129, 131; 711/4, 100, 154, 112, 114; 714/6, 7, 8, 42, 43, 44; 370/357, 359, 360

(56) References Cited

U.S. PATENT DOCUMENTS

| 5,206,939 A | 4/1993 | Yanai et al. ................... 711/4 |
| 5,212,785 A | 5/1993 | Powers et al. ................. 714/5 |

(List continued on next page.)

FOREIGN PATENT DOCUMENTS

| EP | 0 550 853 A2 | 7/1993 |
| EP | 0 751 464 A1 | 1/1997 |
| EP | 0 889 410 A2 | 7/1999 |
| WO | WO 97/07458 | 2/1997 |
| WO | WO 98/28882 | 2/1998 |
| WO | WO 99/26146 | 5/1999 |

OTHER PUBLICATIONS

Kimble, "In–depth fibre channel arbitrated loop", Ch. 2, Port bypass circuit (pp. 42–43); Ch. 15, High–availability loops (pp. 269–282) (Solution Technology, copyright 1996, 1997).*

(List continued on next page.)

Primary Examiner—Matthew Kim
Assistant Examiner—Pierre-Michel Bataille
(74) Attorney, Agent, or Firm—Daly, Crowley & Mofford, LLP

(57) ABSTRACT

A data storage system having a plurality of disk drives. Each one has a pair of ports. A pair of directors controls the flow of data to and from the disk drives. A first fiber channel port by-pass selector section is provided. The first fiber channel selector section includes: an input/output port coupled to a first one of the directors; and, a plurality of output/input ports connected between a first one of the ports of the plurality of disk drives through a first plurality of fiber channel links. The first fiber channel port by-pass selector section is adapted to couple the first one of the directors serially to one, or ones, of the first ports of the plurality of disk drives through a first fiber channel selectively in accordance with a control signal fed to the first fiber channel by-pass selector section. The first fiber channel includes one, or more, of the first plurality of fiber channel links. A second fiber channel port by-pass selector section is provided having an input/output port coupled to a second one of the directors and a plurality of output/ports serially connected between a second one of the pair of ports of the plurality of disk drives through a second plurality of fiber channel links. The second fiber channel port by-pass selector section is adapted to couple the second one of the directors serially to one, or ones, of the second ports of the plurality of disk drives through a second fiber channel selectively in accordance with the control signal. The second fiber channel includes one, or more, of the second plurality of fiber channel links.

2 Claims, 22 Drawing Sheets

U.S. PATENT DOCUMENTS

| | | | | |
|---|---|---|---|---|
| 5,729,763 A | | 3/1998 | Leshem | 710/38 |
| 5,890,214 A | * | 3/1999 | Espy et al. | 710/302 |
| 5,898,828 A | * | 4/1999 | Pignolet et al. | 370/311 |
| 5,922,077 A | | 7/1999 | Espy et al. | 714/7 |
| 5,991,891 A | | 11/1999 | Hahn et al. | 714/4 |
| 6,038,618 A | | 3/2000 | Beer et al. | 710/18 |
| 6,061,753 A | * | 5/2000 | Ericson | 710/107 |
| 6,118,776 A | | 9/2000 | Berman | 370/351 |
| 6,138,199 A | * | 10/2000 | Fleischer | 370/258 |
| 6,154,791 A | * | 11/2000 | Kimble et al. | 710/19 |
| 6,185,203 B1 | | 2/2001 | Berman | 370/351 |
| 6,192,027 B1 | * | 2/2001 | El-Batal | 370/222 |
| 6,195,703 B1 | | 2/2001 | Blumenau et al. | 709/238 |
| 6,219,753 B1 | * | 4/2001 | Richardson | 711/114 |
| 6,260,079 B1 | * | 7/2001 | White | 710/8 |
| 6,282,169 B1 | * | 8/2001 | Kiremidjian | 370/220 |
| 6,338,110 B1 | | 1/2002 | van Cruyningen | 710/131 |
| 6,389,494 B1 | | 5/2002 | Walton et al. | 710/126 |
| 2002/0012342 A1 | * | 1/2002 | Oldfield et al. | 370/386 |

OTHER PUBLICATIONS

Co–Pending U.S. application No. 09/224,194, filed Dec. 30, 1998.

Co–Pending U.S. application No. 09/345,048, filed Jun. 30, 1999, Fibre channel data storage system having expansion/contraction Co–Pending U.S. application No. 09/345,053, filed Jun. 30, 1999, Fibre channel port by–pass selectgor sections for dual ported disk drives.

Co–Pending U.S. application No. 09/352,651, filed Jun. 30, 1999, Fibre channel port by–pass selector sections for dual ported disk drives.

Kumar Malavalli, "High Speed Fibre Channel Switching Fabric Services" Proceedings of the SPIE, vol. 1577, pp. 216–225, Sep. 4, 1991.

Robert W. Kembel, "In–Depth Fibre Channel Arbitrated Loop", Ch. 2, Port bypass Circuit (pp. 42–43); Ch. 15, High–availability loops (pp. 269–282) (Solution Technology, copyright 1996, 1997).

* cited by examiner

FIBRE CHANNEL BY-PASS

BACKGROUND OF THE INVENTION

This invention relates generally to data storage systems and more particularly to data storage systems having a plurality of magnetic storage disk drives in a redundancy arrangement whereby the disk drives are controllable by first disk controllers and second disk controllers. Still more particularly, the invention also relates to systems of such type wherein the disk drives are coupled to the disk controllers through a series, unidirectional, "ring" or, fibre channel protocol, communication system.

As is known in the art, in one type of data storage system, data is stored in a bank of magnetic storage disk drives. The disk drives, and their coupled interfaces, are arranged in sets, each set being controlled by a first disk controller and a second disk controller. More particularly, in order to enable the set of disk drives to operate in the event that there is a failure of the first disk controller, each set is also coupled to a second, or redundant disk controller. Therefore, if either the first or second disk controller fails, the set can be accessed by the other one of the disk controllers.

While today, most disk storage systems of this type use a Small Computer System Interconnection (SCSI) protocol, in order to operate with higher data rates, other protocols are being introduced. One higher data rate protocol is sometimes referred to as a fibre channel (FC) protocol. Such FC channel protocol uses a series, unidirectional, "ring" communication system. In order to provide for redundancy, that is, to enable use of the set of disk drives in the event that the first disk controller fails, as discussed above, the set is coupled to the second, or redundant disk controller, using a separate, independent, "ring", or fibre channel communication protocol. Thus, two fibre channels are provided for each set of disk drives and their disk interfaces; a first fibre channel and a second fibre channel.

As is also known, when using the fibre channel communication protocol, if any element in the channel becomes inoperative, the entire channel becomes inoperative. That is, if the first disk controller becomes inoperative, or if any one of the disk drives in the set coupled to the first channel becomes inoperative (i.e., as where the disk interface fails, the disk interface is inoperative, or removed with its coupled disk drive, or where the disk drive coupled thereto fails, or is removed), the first fibre channel, is "broken", or open, and becomes inoperative. The data stored in the entire portion of the set of disk drives coupled to the first disk channel is therefore unavailable until the inoperative first disk controller or inoperative disk drive is replaced. This is true with either the first channel or the second channel. One technique suggested to solve this problem is through the use of a switch, sometimes referred to as an LRC (i.e., a loop resiliency circuit) switch. Such LRC switch is used to remove an inoperative disk drive from its channel.

In one suggested arrangement, a printed circuit board is provided for each disk drive. The printed circuit board has a pair of LRCs, one for the first channel and one for the second channel. Thus, the open channel may be "closed" in the event of an inoperative disk drive by placing the LRC thereof in a by-pass condition. While such suggested technique solves the inoperative disk drive, or open channel problem, if one of the pair of LRCs fails, the entire printed circuit board having the pair of LRCs must be replaced thereby disrupting both the first and second channels; and, hence, disrupting the operation of the entire data storage system.

One technique suggested to solve this disruption problem requires n LRC switches (where n is the number of disk drives in the set) in the first channel, i.e., one LRC for each one the n disk drives in the set and another n LRC switches in the second channel for each one of the n disk drives in the second channel. The first channel set of n LRCs is mounted on one printed circuit board and the second channel set of n LRCs is mounted on a different printed circuit board. A backplane is used to interconnect the two LRC printed circuit boards, the associated multiplexers, and the disk drives. In order to provide the requisite serial, or sequential, fibre channel connections, an elaborate, complex, fan-out wiring arrangement has been suggested for the backplane. Further, the slots provided for the two LRC boards eliminates two disk drives, and the disk interfaces which would otherwise be plugged into these two slots of the backplane.

Another fibre channel arrangement is described in U.S. Pat. No. 5,729,763 entitled "Data Storage System", inventor Eli Leshem, issued Mar. 17, 1998, assigned to the same assignee as the present invention.

SUMMARY OF THE INVENTION

In accordance with one feature of the invention, a data storage system is provided having a plurality of disk drives. Each one has a pair of ports. A pair of directors is included for controlling the flow of information (i.e, data) to and from the disk drives. A first fibre channel port by-pass selector section is provided. The first fibre channel selector section includes: an input/output port coupled to a first one of the directors; and, a plurality of output/input ports connected between a first one of the ports of the plurality of disk drives through a first plurality of fibre channel links. The first fibre channel port by-pass selector section is adapted to couple the first one of the directors serially to one, or ones, of the first ports of the plurality of disk drives through a first fibre channel selectively in accordance with a control signal fed to the first fibre channel by-pass selector. The first fibre channel includes one, or more, of the first plurality of fibre channel links. A second fibre channel port by-pass selector section is provided having an input/output port coupled to a second one of the directors and a plurality of output/ports serially connected between a second one of the pair of ports of the plurality of disk drives through a second plurality of fibre channel links. The second fibre channel port by-pass selector section is adapted to couple the second one of the directors serially to one, or ones, of the second ports of the plurality of disk drives through a second fibre channel selectively in accordance with the control signal. The second fibre channel includes one, or more, of the second plurality of fibre channel links.

BRIEF DESCRIPTION OF THE DRAWING

These and other features of the invention will become more readily apparent from the follow detailed description when read together with the accompanying drawings, in which:

FIGS. 4, 4A, 4B, 4C and 4D are block diagrams of the system of FIG. 1 arranged in an expanded configuration according to the invention;

DESCRIPTION OF THE PREFERRED EMBODIMENTS

Figure 5:
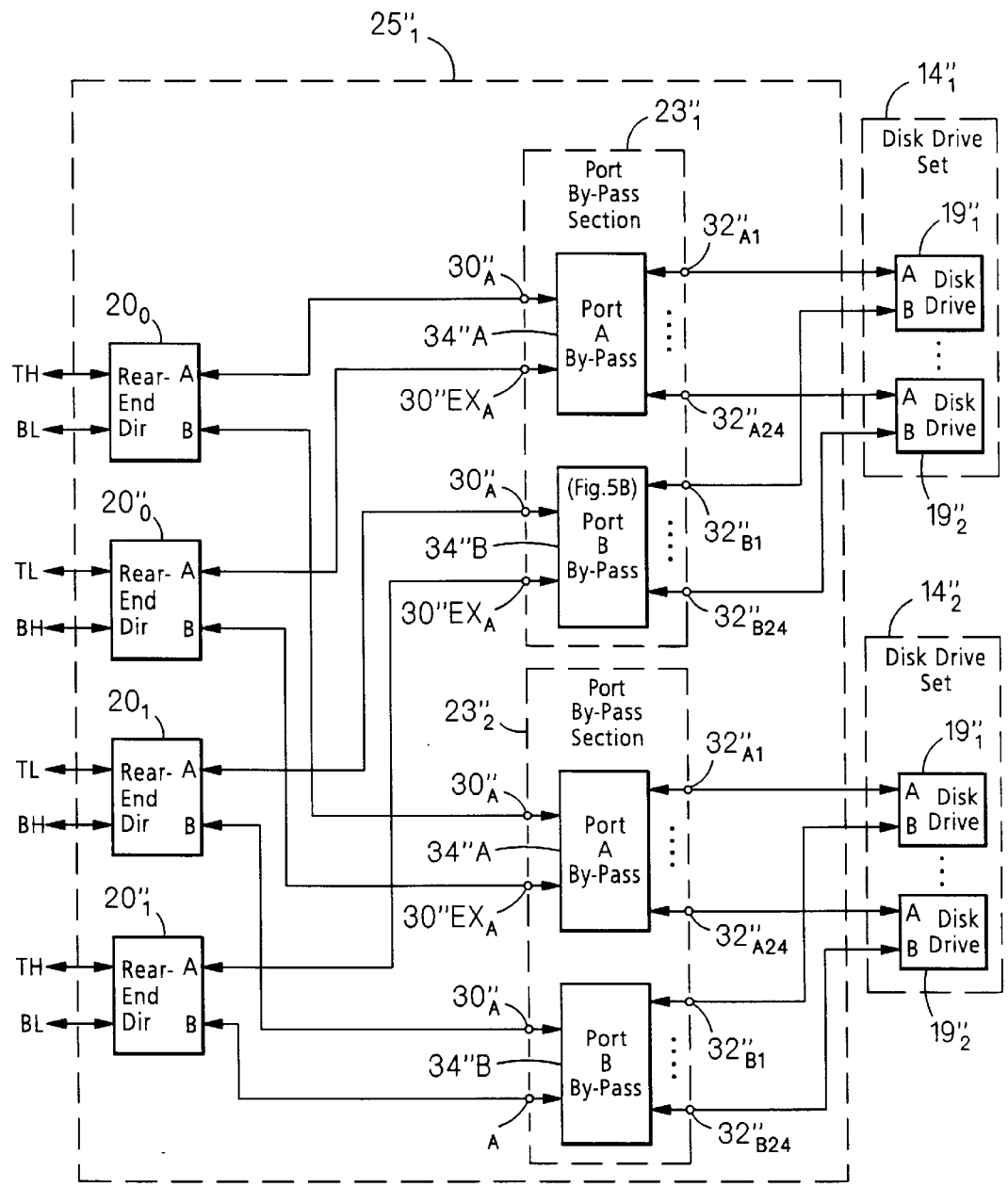
FIGS. 5, 5A and 5B are block diagrams of a redundant fibre channel network adapted for use in the system of FIG. 1 according to the invention.
Figure 5A:
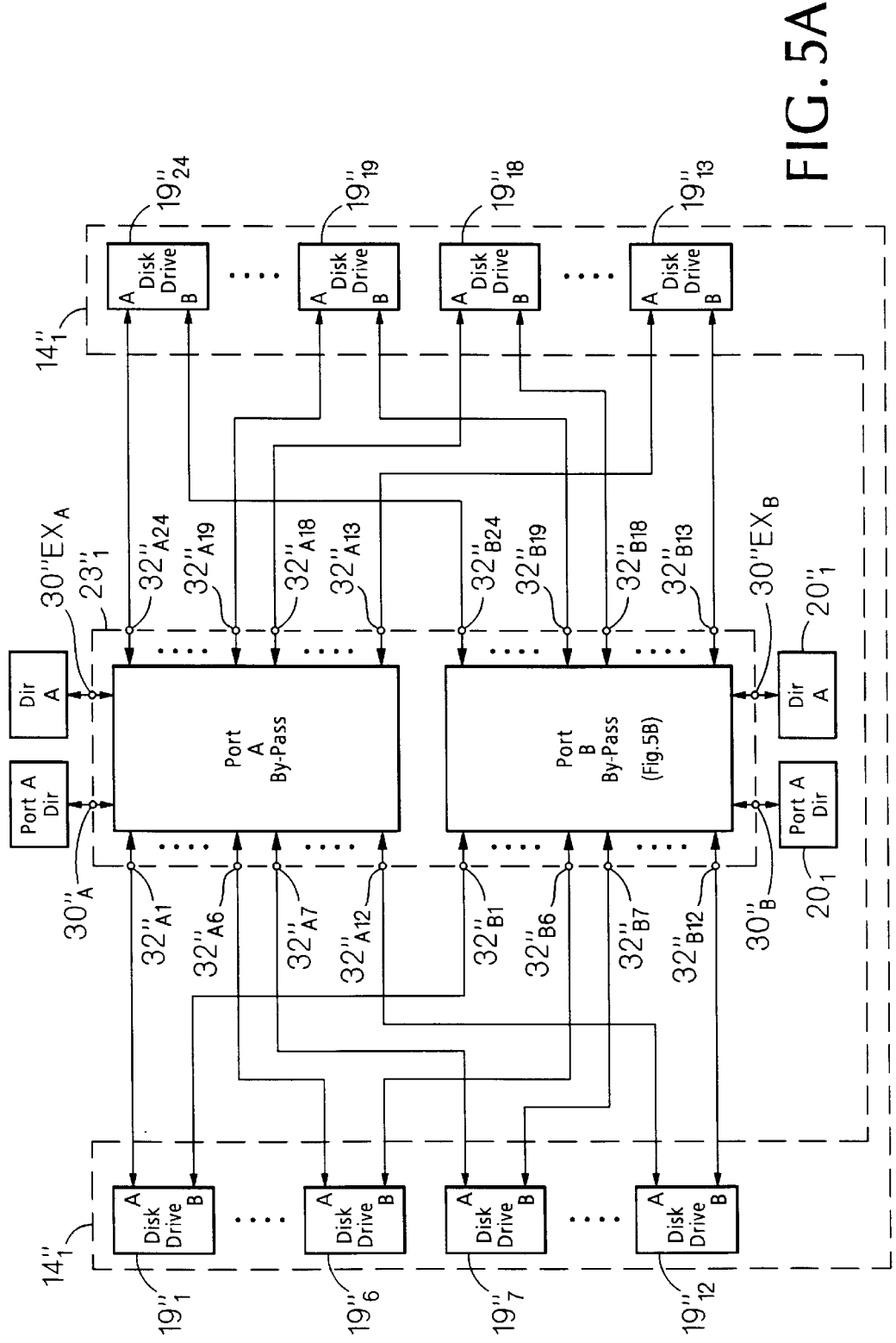
Figure 5B:
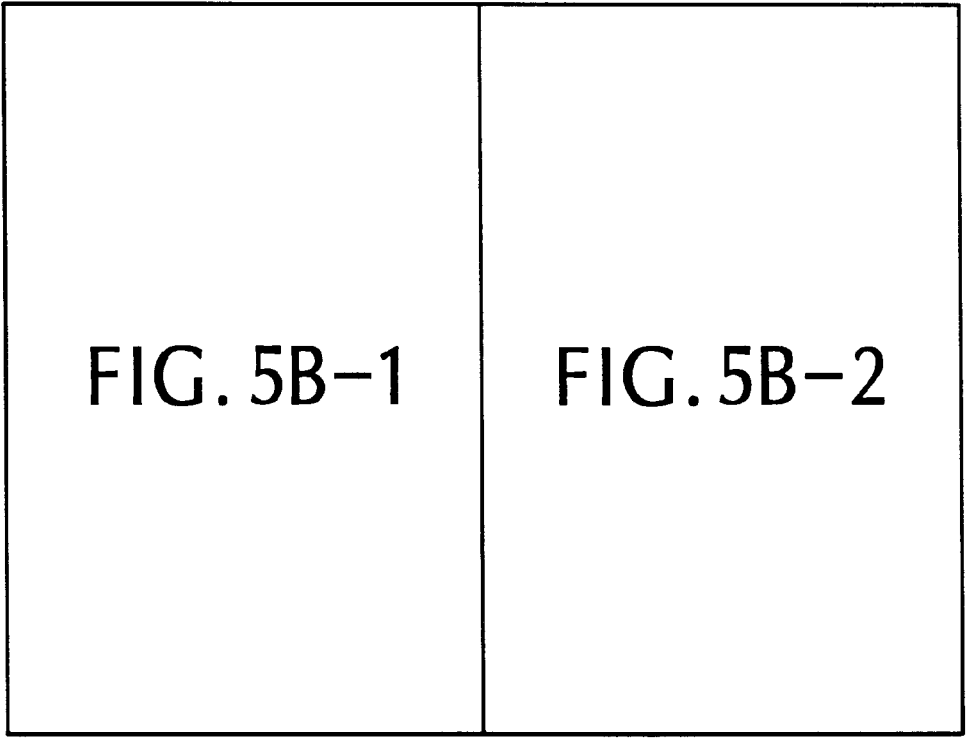
Figures 1, 5B:
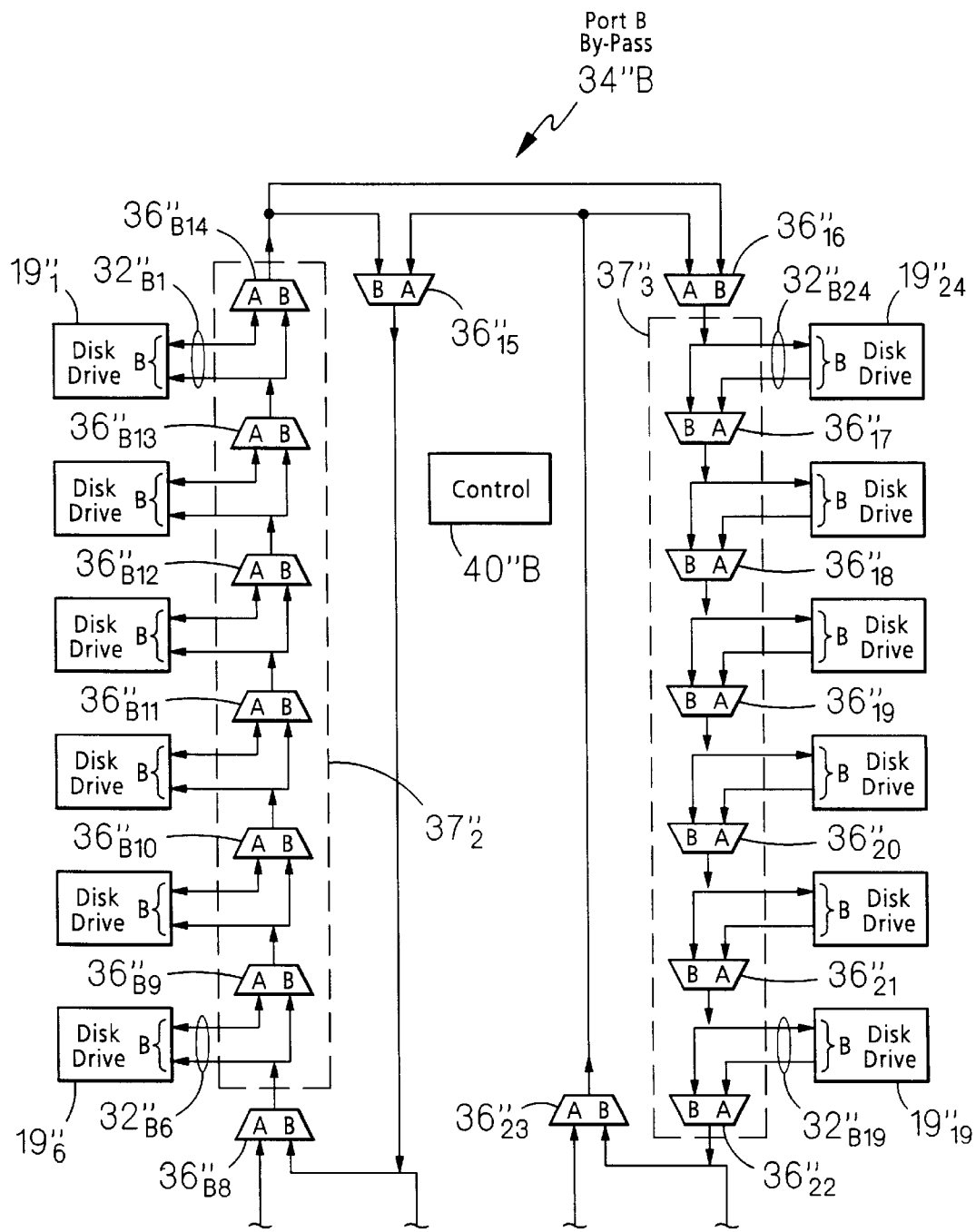
Figures 2, 5B:
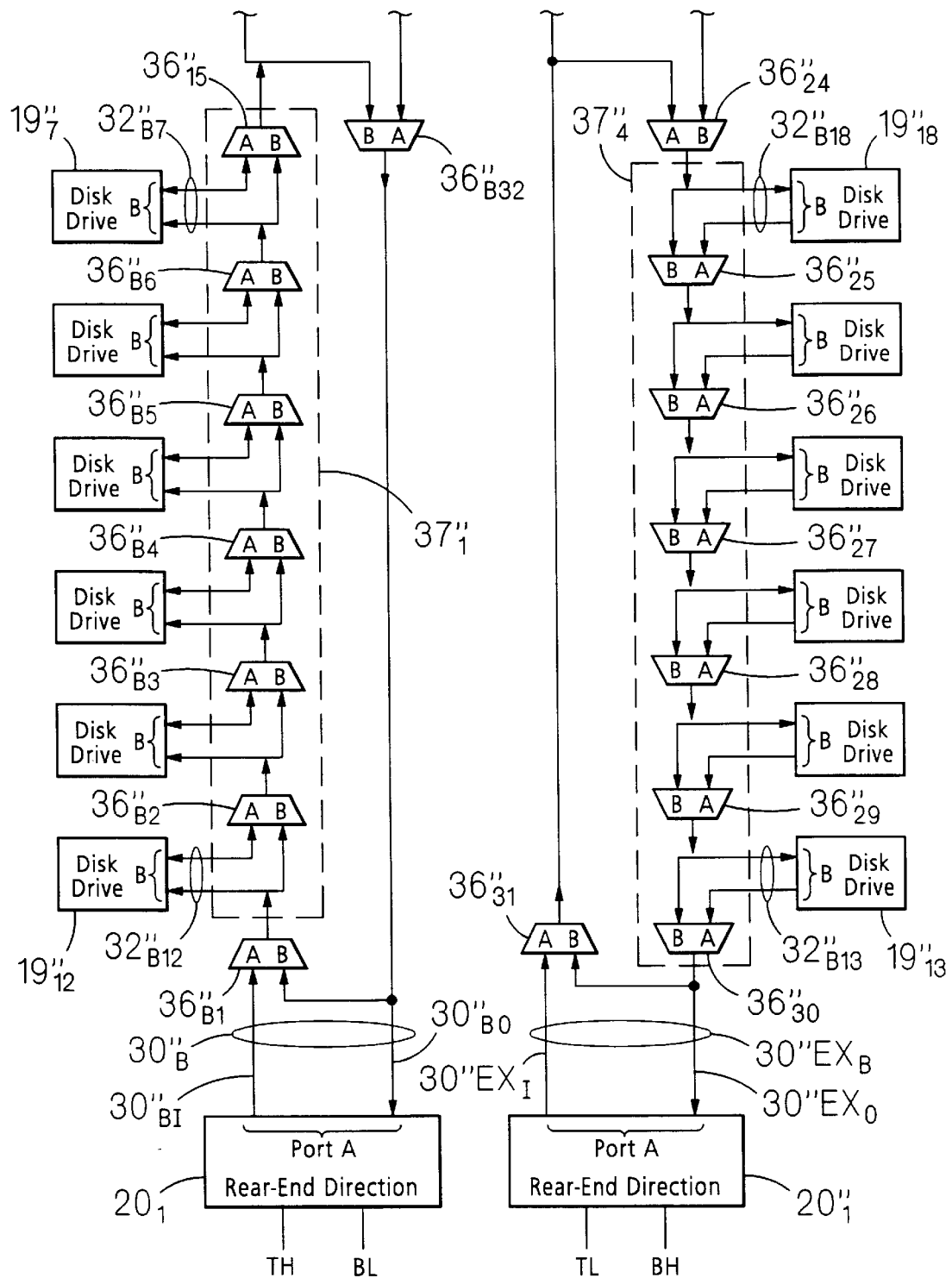

Referring now to FIG. 1, a data storage system 10 is shown wherein a host computer 12 is coupled to a bank 14 of disk drives through a system interface 16. The system interface 16 includes a cache memory 18, having high memory address sections 18H and low address memory sections 18L. A plurality of directors $20_0$–$20_{15}$. is provided for controlling data transfer between the host computer 12 and the bank 14 of disk drives as such data passes through the cache memory 18. A pair of high address busses TH, BH is electrically connected to the high address memory sections 18H. A pair of low address busses TL, BL electrically connected to the low address memory sections 18L. The cache memory 18 has a plurality of storage location addresses. Here, the storage locations having the higher addresses are in the high address memory sections 18H and the storage locations having the lower addresses are in the low address memory sections 18L. It should be noted that each one of the directors $20_0$–$20_{15}$ is electrically connected to one of the pair of high address busses TH, PH and one of the pair of low address busses TL, BL. Thus, each one of the directors $20_0$–$20_{15}$ is able to address all locations in the entire cache memory 18 (i.e., to both the high address memory sections 18H and the low address memory sections 18L) and is therefore able to store data in and retrieve data from any storage location in the entire cache memory 18.

More particularly, a rear-end portion of the directors, here directors $20_0$–$20_3$ and $20_{12}$–$20_{15}$, is electrically connected to the bank 14 of disk drives through fibre channel (FC) port by-pass sections $23_1$–$23_8$ (described in more detail in connection with FIG. 3), respectively. and a front-end portion of the directors, here directors $20_4$–$20_{11}$, is electrically connected to the host computer 12 through I/O adapter cards $22_1$–$22_8$, respectively, as indicated. It should also be noted that each end of the busses TH, TL, BH, BL terminates in a pair of master and slave arbiters bus arbiters, not shown, as described in co-pending patent application Ser. No. 09/224, 194 filed Dec. 30, 1998, entitled DATA STORAGE SYSTEM, inventor Mark Zani, assigned to the same assignee as the present invention, the entire subject matter thereof being incorporated herein by reference.

In operation, when the host computer 12 wishes to store data, the host computer 12 issues a write request to one of the front-end directors $20_4$–$20_{11}$ to perform a write command. One of the front-end directors $20_4$–$20_{11}$ replies to the request and asks the host computer 12 for the data. After the request has passed to the requesting one of the front-end directors $20_4$–$20_{11}$, the director determines the size of the data and reserves space in the cache memory 18 to store the request. The front-end director then produces control signals on either a high address memory bus (TH or BH) or a low memory address bus (TL, BL) connected to such front-end director depending on the location in the cache memory 18 allocated to store the data and enable the transfer to the cache memory 18. The host computer 12 then transfers the data to the front-end director. The front-end director then advises the host computer 12 that the transfer is complete. The front-end director looks up in a Table, not shown, stored in the cache memory 18 to determine which one of the rear-end directors $20_0$–$20_3$ and $20_{12}$–$20_{15}$ is to handle this request. The Table maps the host computer 12 address into an address in the bank 14 of disk drives. The front-end director then puts a notification in a "mail box" (not shown and stored in the cache memory 18) for the rear-end director which is to handle the request, the amount of the data and the disk address for the data. Other rear-end directors poll the cache memory 18 when they are idle to check their "mail boxes". If the polled "mail box" indicates a transfer is to be made, the rear-end director processes the request, addresses the disk drive in the bank, reads the data from the cache memory and writes it into the addresses of a disk drive in the bank 14. When data is to be read from the disk drive to the host computer 12 the system operates in a reciprocal manner.

Each one of the rear-end portion of the directors $20_0$–$20_3$ is identical in construction and are described in detail in the above-referenced co-pending patent application Ser. No. 09/224,194 to include a pair of central processing sections, CPU X and CPU Y, a dual port random access memory (RAM), and shared resources (Flash memories, etc,) coupled to the bank 14 of disk drives (FIG. 1) through the fibre channel (FC) port by-pass sections (FIG. 3), as indicated and to a high memory address bus, here TH, and low memory address bus, here BL. It should be noted that the director $20_0$–$20_3$ and $20_{12}$–$20_{15}$ has a first output port, A, and a second output port, B. Further, it should be noted that different pairs of the rear-end directors $20_0$, $20_1$; $20_2$, $20_3$; $20_{12}$, $20_{13}$ (not shown); and, $20_{14}$, $20_{15}$ are arranged in redundant fibre channel (FC) networks $25_1$–$25_4$, respectively, as indicated. Still further, it is noted that each one of the redundant fibre channel (FC) networks $25_1$–$25_4$ also includes pairs of the fibre channel (FC) port by-pass sections $23_1$, $23_2$; $23_3$, $23_4$; $23_5$ (not shown), $23_6$ (not shown); and, $23_7$, $23_8$, respectively, as indicated and disk drive sets $14_1$, $14_2$; $14_3$, $14_4$; $14_5$ (not shown), $14_6$ (not shown); and, $14_7$, $14_8$, respectively, as indicated. Each one of the pairs of the redundant fibre channel (FC) networks $25_1$–$25_4$ is identical in construction, an exemplary one thereof, here redundant fibre channel (FC) networks $25_1$ is shown in detail in FIG. 2.

Figure 1A:
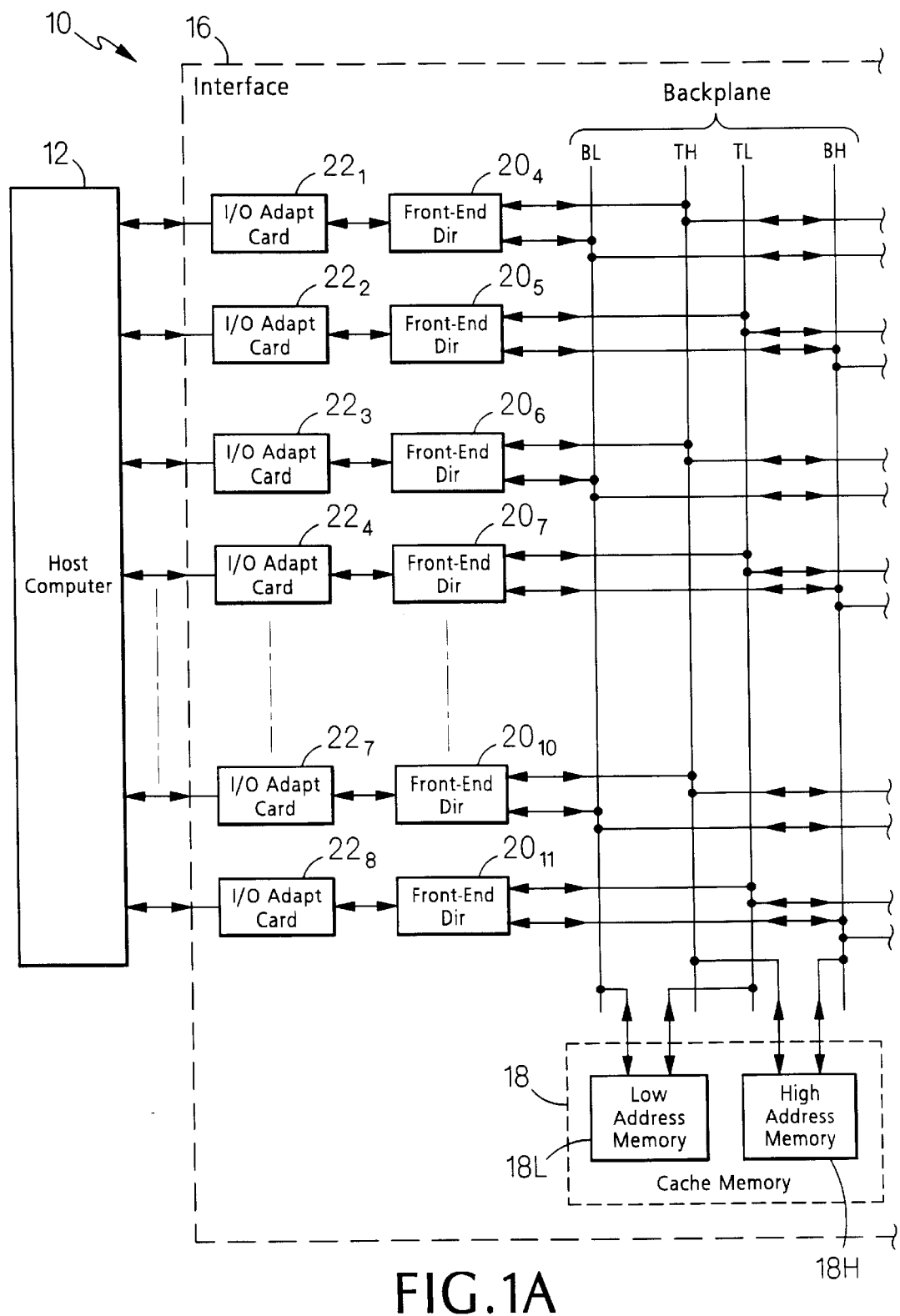
FIG. 1 is a block diagram of a data storage system according to the invention.
Figure 1B:
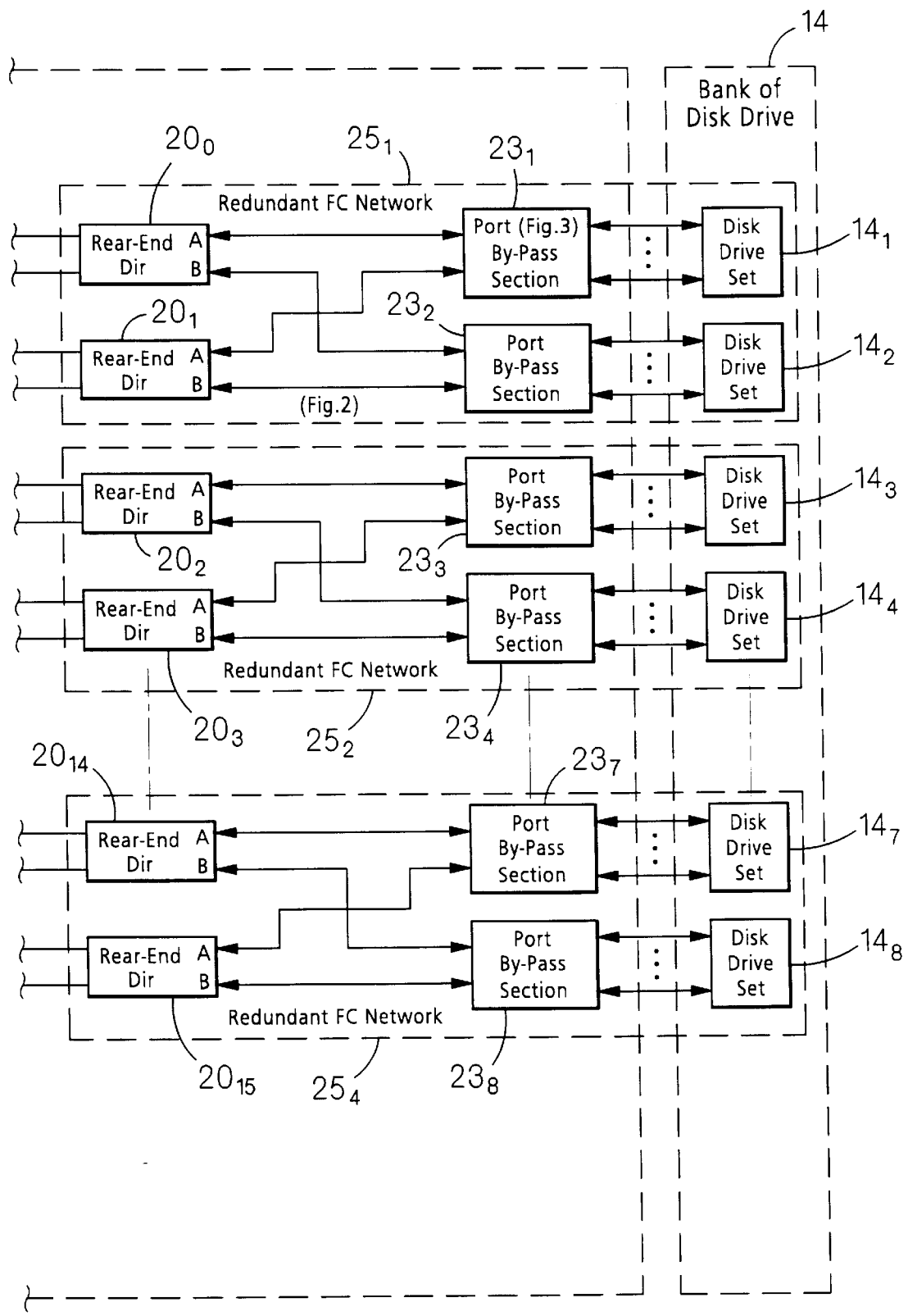
Figure 2:
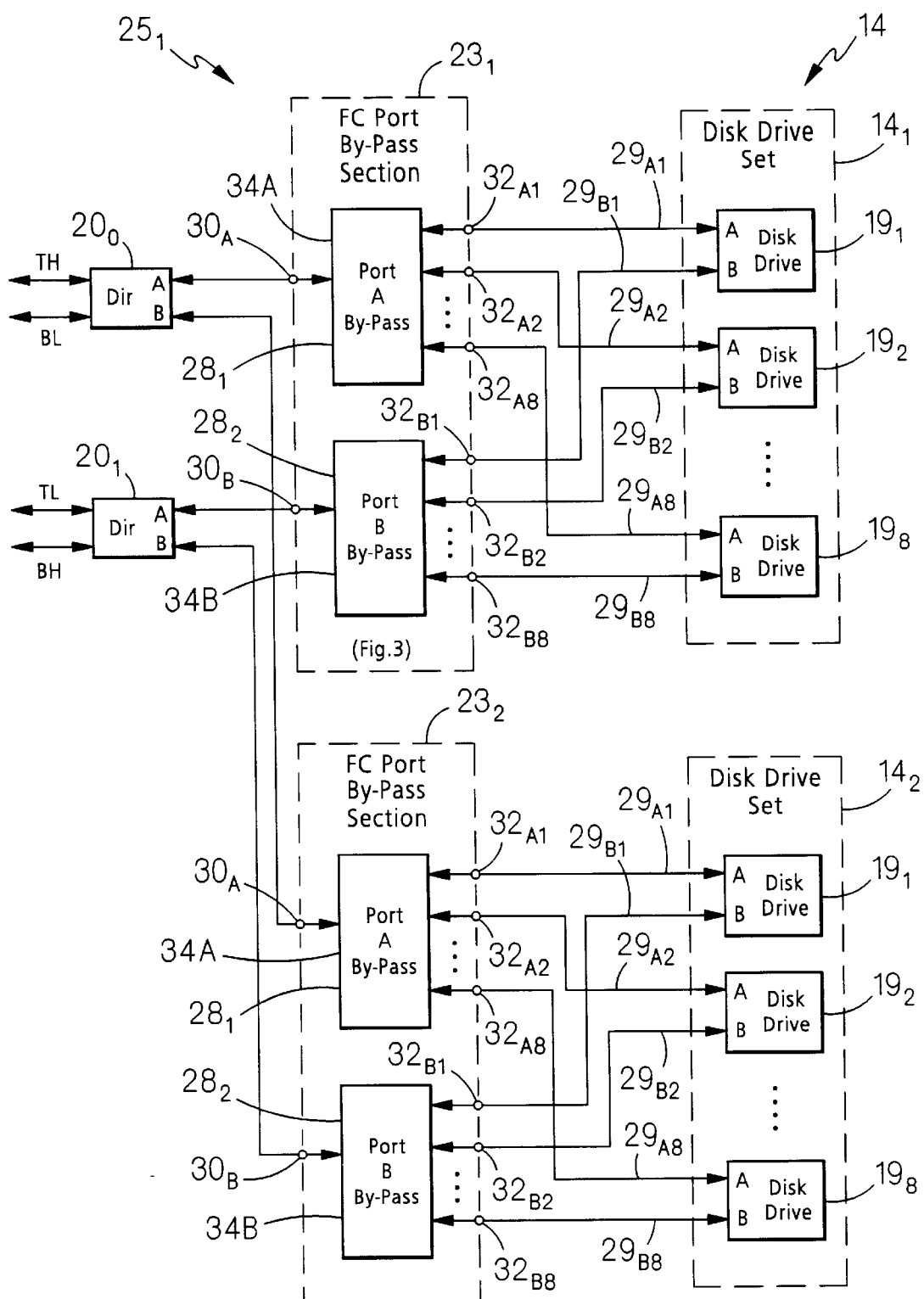
FIG. 2 is a block diagram of a redundant fibre channel network used in the system of FIG. 1 according to the invention.

Thus, as shown in FIG. 2, the first port A and second port B of director $20_0$ is connected to both FC port by-pass section $23_1$ and to FC port by-pass section $23_2$. Likewise, the first port A and second port B of director $20_1$ is connected to both FC port by-pass section $23_1$ and to FC port by-pass section $23_2$. More particularly, both directors $20_0$ and $20_1$ of the redundant FC network $25_1$ are connected to the pair of FC port by-pass sections $23_1$, $23_2$. Each one of the FC port by-pass sections $23_1$, $23_2$ includes a pair of FC port by-passes $34_A$ and $34_B$. Each one of the FC port by-passes $34_A$ and $34_B$ is connected to a corresponding one of a plurality of sets $14_1$, $14_2$ of the disk drives in the bank of disk drives 14 (FIG. 1). Each one of the FC port by-passes $34_A$, $34_B$ and is identical in construction, an exemplary one thereof, here FC port by-pass $34_A$ being shown in detail in FIG. 3 connected to set $14_1$ of the disk drives and to directors $20_0$ and $20_1$. It is noted that director $20_0$ is connected to busses TH and BL and that director $20_1$ is connected to busses TL and BH. Thus, the redundant FC network $25_1$ (FIG. 1) is connected to all four busses TH, BH, TL, and BL.

More particularly, and referring again also to FIG. 2, it is noted that each one of the disk drive sets $14_1$, $14_2$ includes a plurality of, here for example eight, disk drives $19_1$–$19_8$, it being understood that the number of disk drives 19 in a set can be selected in accordance with the requisite storage requirements. It is also noted that each one of the disk drives $19_1$–$19_8$ includes a pair of input/output ports A, B. As noted above, each one of the FC port by-pass sections $23_1$–$23_8$ is identical in construction. An exemplary one thereof, here FC port by-pass section $23_1$ is shown in FIG. 2 to include: an input/output port 30A coupled to the A port of director $20_0$ and a plurality of, here in this example, eight, output/input ports $32_{A1}$–$32_{A8}$ serially connected between a first one of the ports, here port A, of the plurality of disk drives $19_1$–$19_8$ through a plurality of fibre channel links $29_{A1}$–$29_{A8}$. The fibre channel port by-pass selector section $23_1$ is adapted to couple port A of director 20, serially to a selected one, or ones, of port A of the plurality of disk drives $19_1$–$19_8$ in set $14_1$ through a first fibre channel comprising one, or more, of the plurality of fibre channel links $29_{A1}$–$29_{A8}$ during a normal mode of operation. The fibre channel port by-pass selector section $23_1$ also has an input/output port $30_B$ coupled to the A port of director 20, and a plurality of output/ports $32_{B1}$–$32_{B8}$ serially connected between the B ports of the plurality of disk drives $19_1$–$19_8$ through fibre channel links $29_{B1}$–$29_{B8}$, as indicated. The fibre channel port by-pass selector section $23_1$ is adapted to couple the A port of director $20_1$ serially to a selected one, or ones, of the B ports of the plurality of disk drives $19_1$–$19_8$ in set $14_1$ through a second fibre channel comprising one, or more, of the second plurality of fibre channel links $29_{B1}$–$29_{B8}$ in the normal operating mode.

Likewise, fibre channel port by-pass selector section $23_2$ in FIG. 2 is shown to includes: an input/output port $30_A$ coupled here, however, coupled to the B port of director $20_0$ and a plurality of, here in this example, eight, output/input ports $32_{A1}$–$32_{A8}$ serially connected between port A of the plurality of disk drives $19_1$–$19_8$ in set $14_2$ through a plurality of fibre channel links $29_{A1}$–$29_{A8}$. The fibre channel port by-pass selector section $23_2$ is adapted to couple port B of director $20_0$ serially to a selected one, or ones, of port A of the plurality of disk drives $19_1$–$19_8$ in set $14_2$ through a first fibre channel comprising one, or more, of the plurality of fibre channel links $29_{A1}$–$29_{A8}$ in section $23_2$ during a normal node of operation. The fibre channel port by-pass selector section $23_2$ also has an input/output port $30_B$ coupled to the B port of director $20_1$ and a plurality of output/ports $32_{B1}$–$32_{B8}$ serially connected between the B ports of the plurality of disk drives $19_1$–$19_8$ in set $14_2$ through fibre channel links $29_{B1}$–$29_{B8}$, as indicated. The fibre channel port by-pass selector section $23_2$ is adapted to couple the B port of director $20_1$ serially to a selected one, or ones, of the B ports of the plurality of disk drives $19_1$–$19_8$ in set $14_2$ through a second fibre channel comprising one, or more, of the second plurality of fibre channel links $29_{B1}$–$29_{B8}$ in section $23_2$ in the normal operating mode.

It is noted that director $20_0$ is able to access the disk drives $19_1$–$19_8$ in set $14_2$ through its port B in the event of a failure in director $20_1$ and, likewise, director $20_1$ is able to access disk drives $19_1$–$19_8$ in set $14_1$ through its A port in the event of a failure in director $20_0$.

It is also noted that in the event of a failure of, or removal of, any one of the port A or port B by-passes 34A, 34B, both sets of disk drives $14_1$ and $14_2$ are still accessible from one of the directors $20_0$ and $20_1$. For example, if the port A by-pass 34A of fibre channel port by-pass section $23_1$ fails or is removed, the set $14_1$ of disk drives is accessible from director $20_1$, via the path between port A of director $20_1$, the port B by-pass 34B of fibre channel by-pass section $23_1$, and the port B of the disk drives in set $14_1$. In like manner, if the port B by-pass 34B of fibre channel port by-pass section $23_1$ fails or is removed, the set $14_1$ of disk drives is accessible from director $20_1$, via the path between port A of director $20_0$, the port A by-pass 34A of fibre channel by-pass section $23_1$, and the port A of the disk drives in set $14_1$. If the port A by-pass 34A of fibre channel port by-pass section $23_2$ fails or is removed, the set $14_2$ of disk drives is accessible from director $20_0$, via the path between port B of director $20_1$, the port B by-pass 34B of fibre channel by-pass section $23_1$, and the port B of the disk drives in set $14_2$. In like manner, if the port B by-pass 34B of fibre channel port by-pass section $23_2$ fails or is removed, the set $14_2$ of disk drives is accessible from director $20_0$, via the path between port B of director $20_0$, the port A by-pass 34A of fibre channel by-pass section $23_2$, and the port A of the disk drives in set $14_2$.

Figure 3:
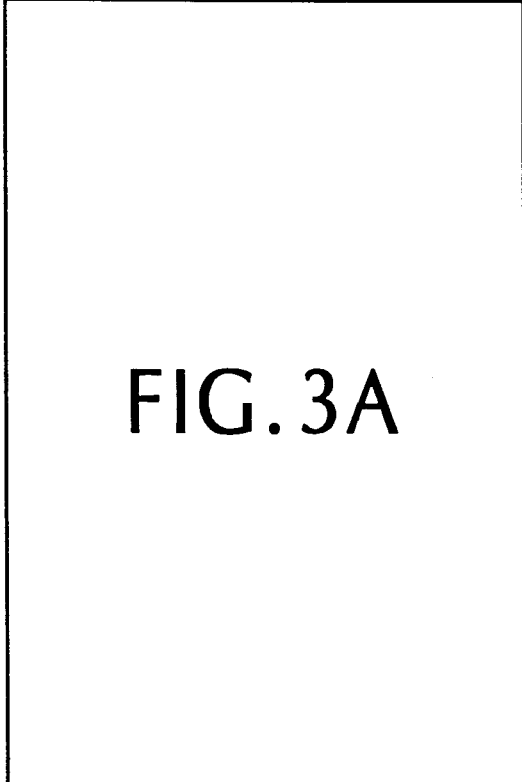
FIG. 3 is a block diagram of a port by-pass section used in the redundant fibre channel network of FIG. 3 coupled to a bank of disk drives used in the system of FIG. 1 according to the invention.
Figure 3:
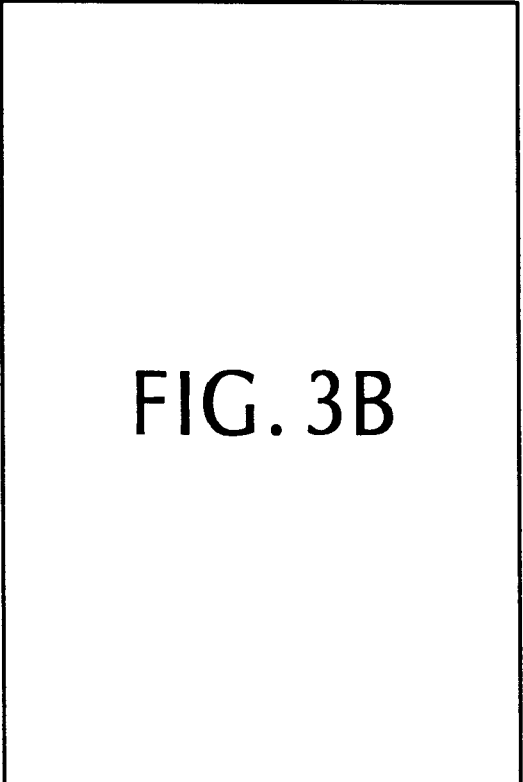
Figure 3A:
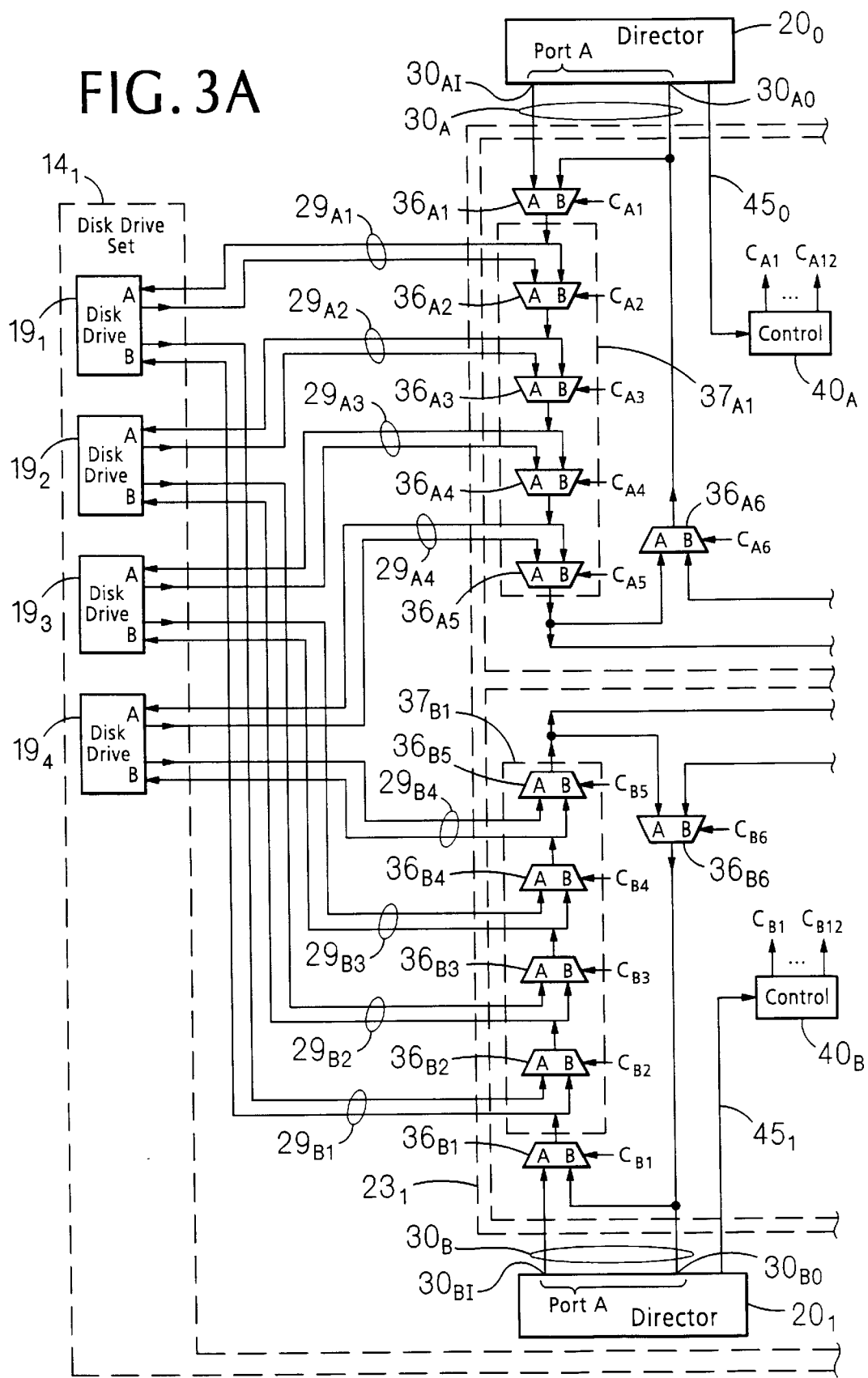
Figure 3B:
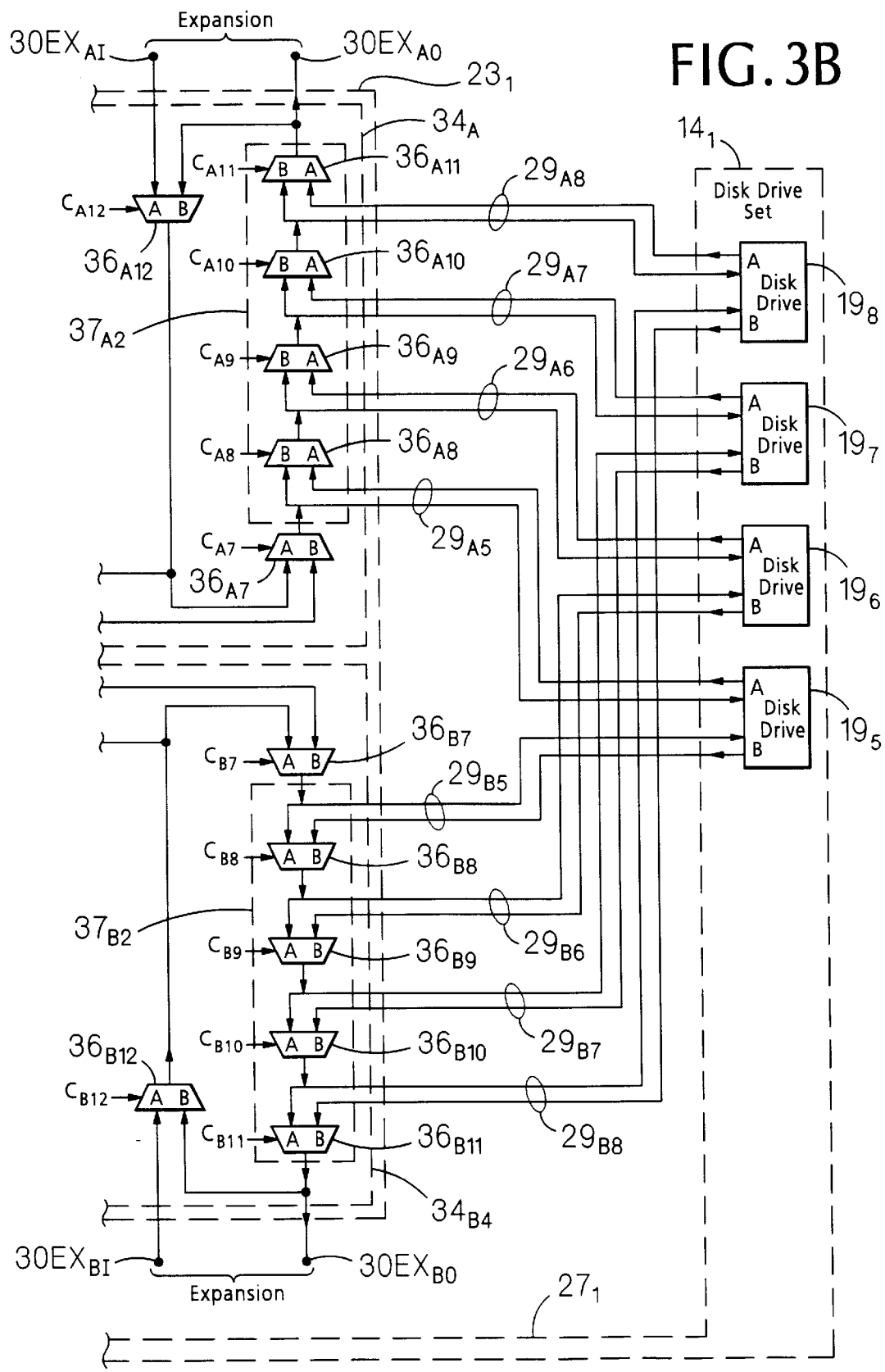

Referring now to FIG. 3, an exemplary one of the FC port by-pass sections $23_1$–$23_8$, here section $23_1$ is shown in detail connected to set $14_1$ of disk drives $19_1$–$19_8$ and to ports A of directors $20_0$ and $20_1$. As shown also in FIG. 2, the FC port by-pass section $23_1$ includes a pair of FC port by-passes $34_A$, $34_B$. The FC port by-pass $34_A$ is coupled between input/output port $30_A$ and the A ports of the disk drives $19_1$–$19_8$ in set $14_1$ through fibre channel links $29_{A1}$–$29_{A8}$ and the FC port by-pass $34_B$ is coupled between input/output port $30_B$ and the B ports of the disk drives $19_1$–$19_8$ in set $14_1$ through fibre channel links $29_{B1}$–$29_{B8}$.

Referring again to FIG. 3, the FC port by-pass $34_A$ includes selectors $36_{A1}$–$36_{A12}$ and a control section $40_A$. (It should be understood that the number of selectors is determined in accordance with the requisite storage requirements). Each one of the selectors $36_{A1}$–$36_{A12}$ has a pair of input ports (i.e., an A input and a B input) and an output port, one of the input ports A or B being coupled to the output port selectively in accordance with a control signal $C_{A1}$–$C_{A12}$, respectively, fed thereto, as indicated, by the control section $40_A$ It is also noted that input/output port $30_A$ has an input port $30_{AI}$, and an output port $30_{AO}$.

It is noted that the selectors $36_{A1}$–$36_{A5}$; and, $36_{A8}$–$36_{A11}$ are arranged in two selector sections $37_{A1}$ and $37_{A2}$. Section $37_{A1}$ is coupled to disk drives $19_1$–$19_4$ and section $37_{A2}$ is coupled to disk drives $19_5$–$19_8$. Each section $37_{A1}$, $37_{A2}$ is used to control whether one, or more, of the disk drives coupled thereto should be by-passed. In like manner. the selectors $36_{B1}$–$36_{B5}$; and, $36_{B8}$–$36_{B11}$ are arranged in two selector sections $37_{B1}$ and $37_{B2}$ Section $37_{B1}$ is coupled to disk drives $19_1$–$19_4$ and section $37_{B2}$ is coupled to disk drives $19_5$–$19_8$. Each section $37_{B1}$, $37_{B2}$ is used to control whether one, or more, of the disk drives $19_1$–$19_4$, $19_5$–$19_8$ coupled thereto, respectively, should be by-passed.

Figure 4:
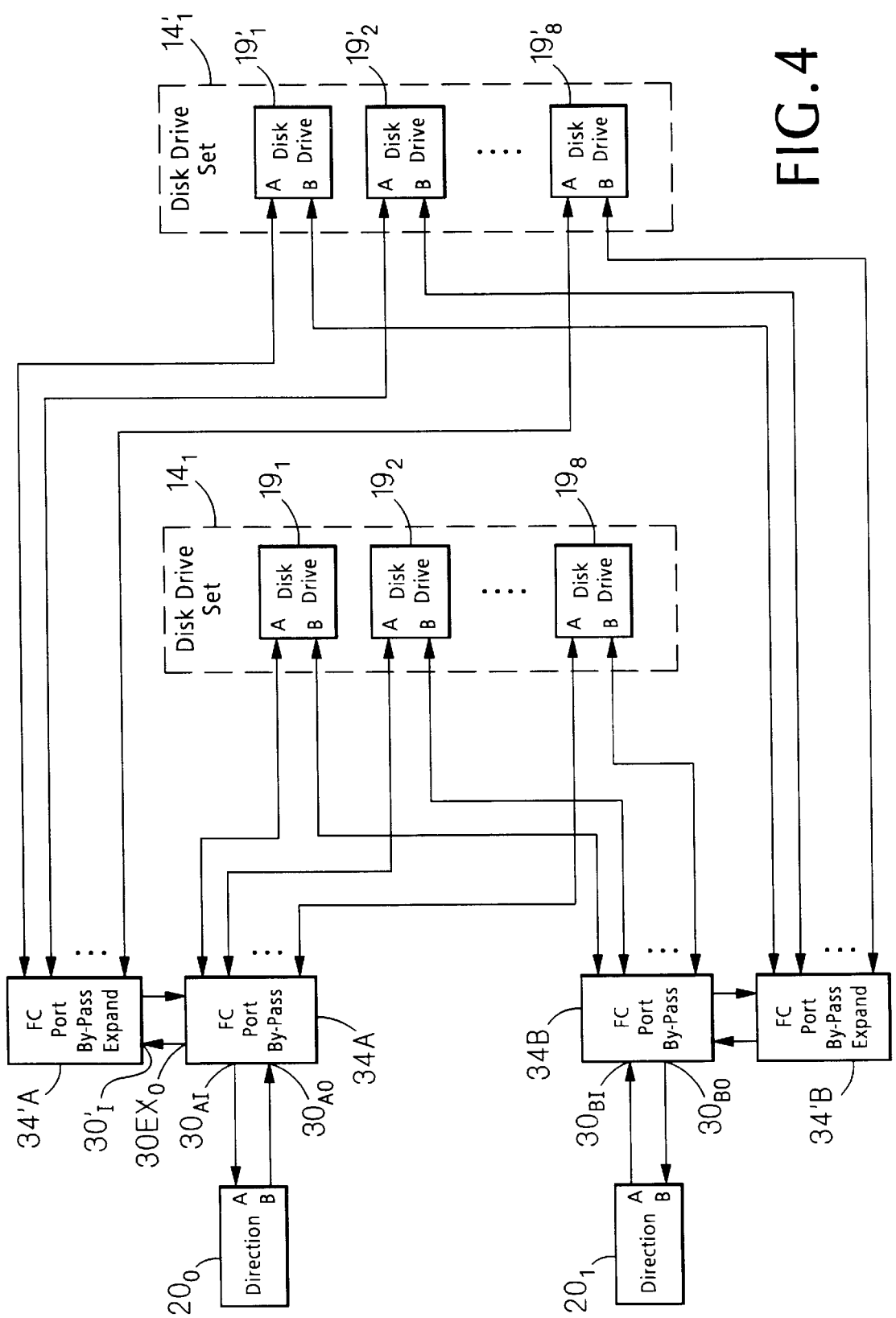
Figure 4A:
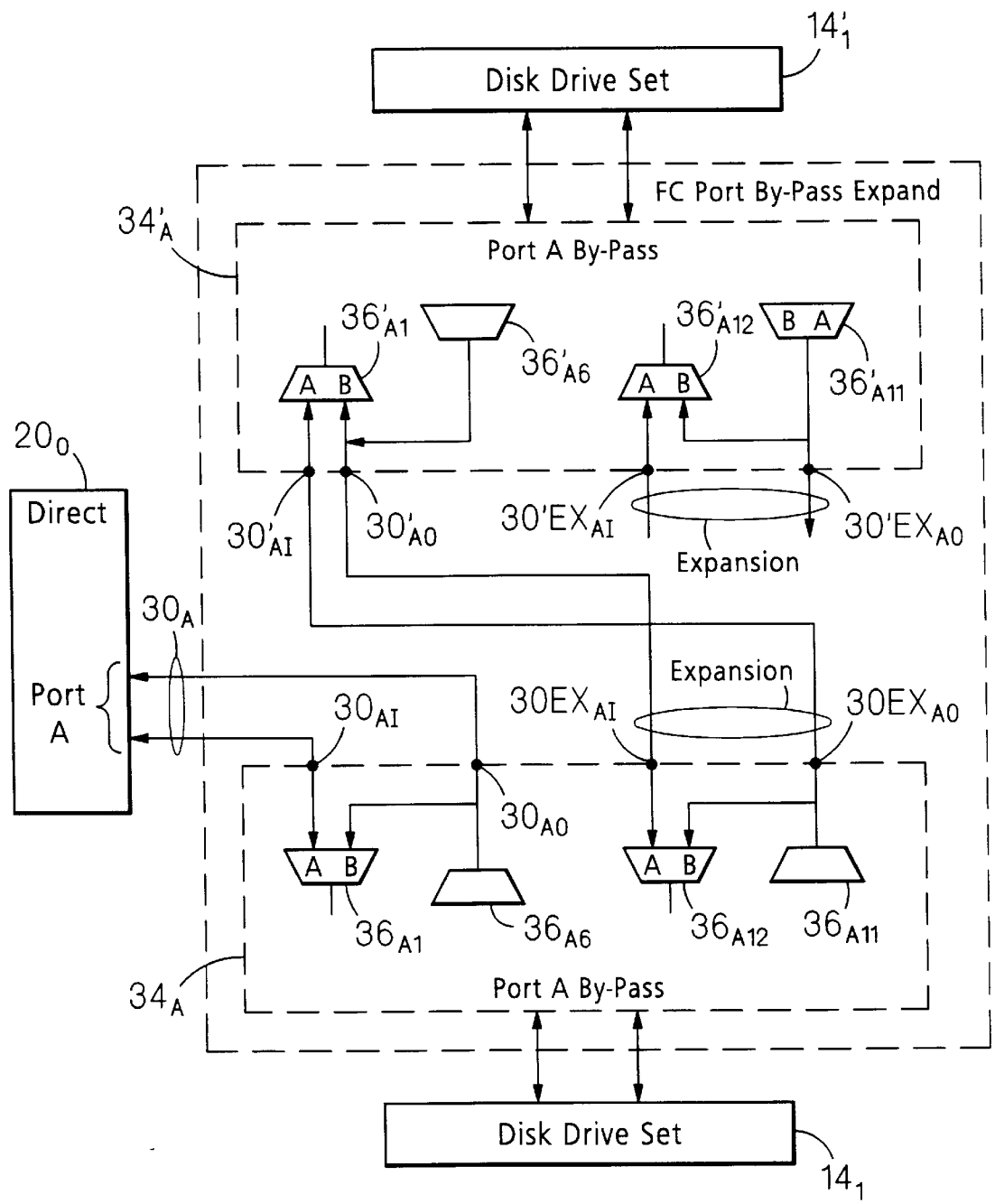
Figure 4C:
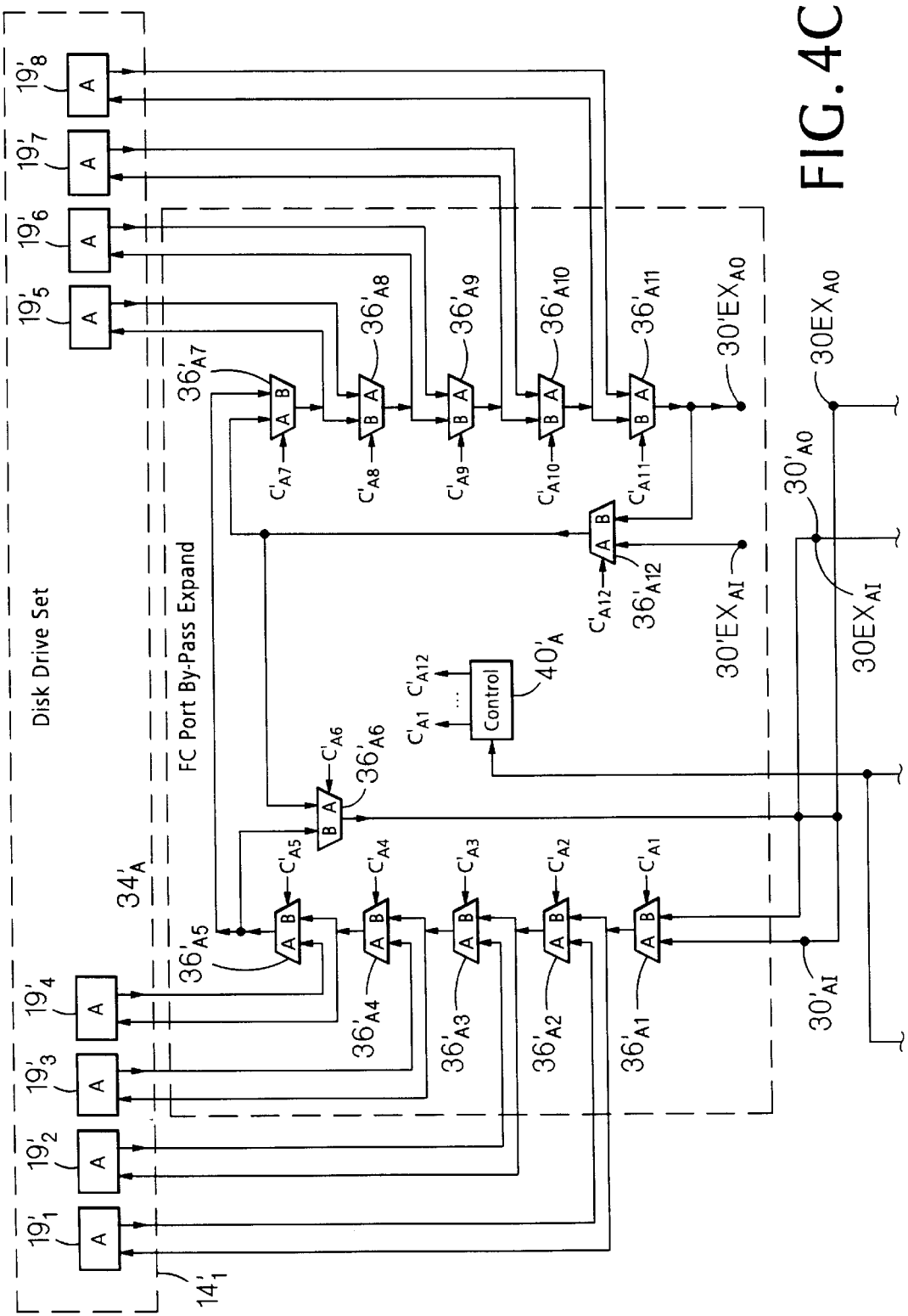
Figure 4D:
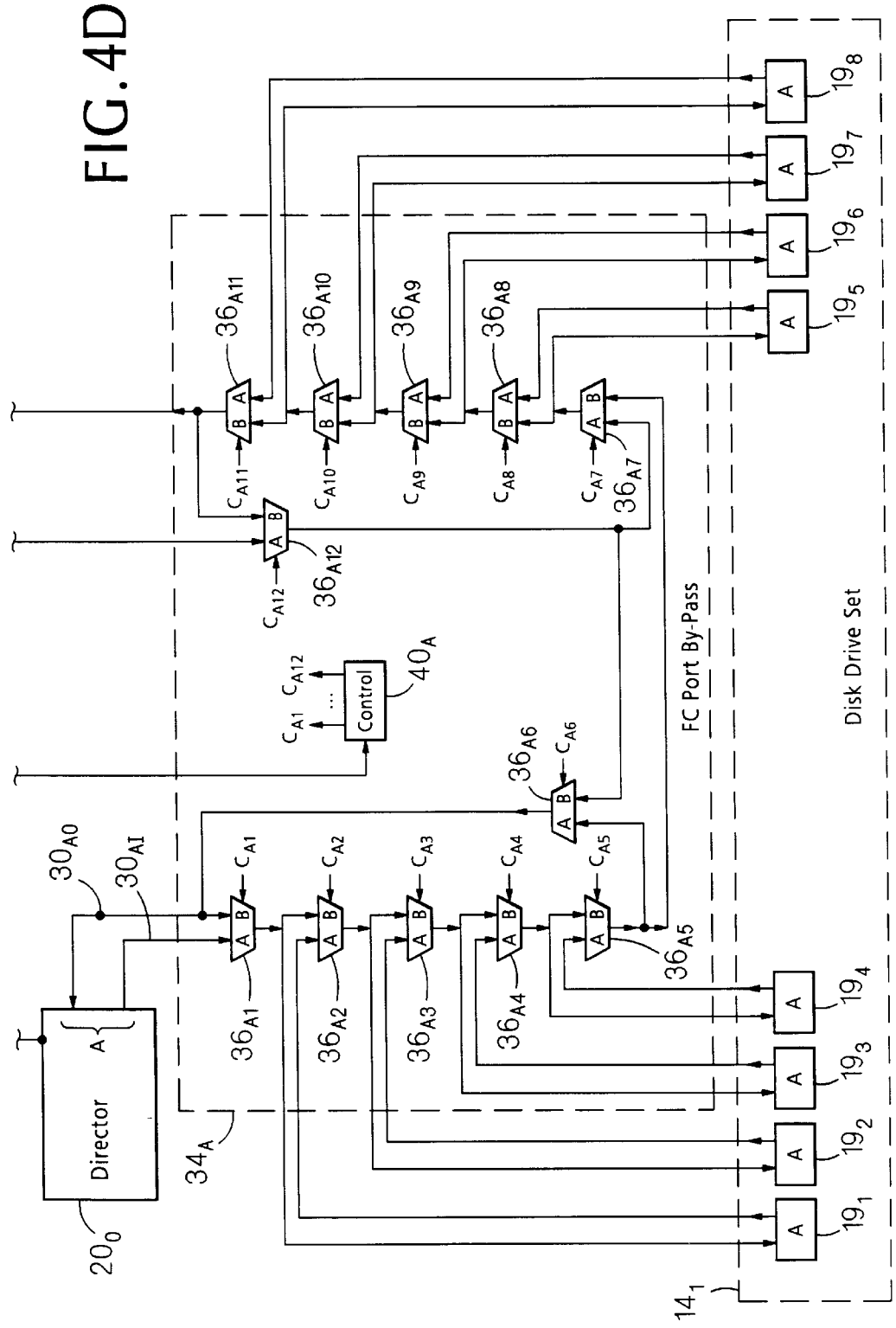

Selector $36_{A1}$ has its A input connected to input port $30_{AI}$ and its B input port connected to output port $30_{AO}$. The outputs of selectors $36_{A1}$–$36_{A11}$ are connected to the B inputs of selectors $36_{A2}$–$36_{A12}$ respectively. The outputs of selectors $36_{A1}$–$36_{A4}$ and $36_{A7}$–$36_{A10}$ are also coupled to the A ports of disk drives $19_1$–$19_8$, respectively as shown. The output of selector $36_{A12}$ is connected to the A input of selector $36_{A6}$. The output of selector $36_{A6}$ is connected to both the B input of selector $36_{A1}$ and the input port $30_{AI}$ of director $20_0$, as indicated. The output of selector $36_{A12}$ is also connected to the A input of selector $36_{A7}$. The A inputs of selectors $36_{A2}$–$36_{A5}$ and $36_{A8}$–$36_{A11}$ are fed thereto from the A ports of disk drives $19_1$–$19_8$, respectively, as indicated. It is noted that the output of selector $36_{A11}$, in addition to being fed to the B input of selector $36_{A12}$ is connected to an expansion port $30_{EXAO}$ and that the A input of selector $36_{A12}$ is connected to an expansion port $30_{EXAI}$, for reasons to be discussed in more detail below in connection with FIGS. 4, 4A and 4B.

The FC port by-pass $34_B$ includes selectors $36_{B1}$–$36_{B12}$ and a control section $40_B$. Each one of the selectors $36_{B1}$–$36_{B12}$ has a pair of input ports (i.e., an A input and a B input) and an output port, one of the input ports A or B being coupled to the output port selectively in accordance with a control signal $C_{B1}$–$C_{B12}$, respectively, fed thereto, as indicated, by the control section $40_B$. It is also noted that input/output port $30_B$ has an input port $30_{BI}$ and an output port $30_{BO}$.

It is noted that the selectors $36_{B1}$–$36_{B5}$; and, $36_{B8}$–$36_{B11}$ are arranged in two selector sections $37_{B1}$ and $37_{B2}$. Section $37_{B1}$ is coupled to disk drives $19_1$–$19_4$ and section $37_{B2}$ is coupled to disk drives $19_5$–$19_8$. Each section $37_{B1}$, $37_{B2}$ is used to control whether one, or more, of the disk drives coupled thereto should be by-passed. In like manner, the selectors $36_{A1}$–$36_{B5}$; and, $36_{A8}$–$36_{A11}$ are arranged in two selector sections $37_{A1}$ and $37_{A2}$. Each section $37_{B1}$, $37_{B2}$ is used to control whether one, or more, of the disk drives $19_1$–$19_4$, $19_5$–$19_8$ coupled thereto, respectively, should be by-passed. Selector $36_{B1}$ has its A input connected to input port $30_{B1}$ and its B input port connected to output port $30_{BO}$. The outputs of selectors $36_{B1}$–$36_{B11}$ are connected to the B inputs of selectors $36_{B2}$–$36_{B12}$, respectively. The outputs of selectors $36_{B1}$–$36_{B4}$ and $36_{B7}$–$36_{B10}$ are also coupled to the B ports of disk drives $19_1$–$19_8$, respectively as shown. The output of selector $36_{B12}$ is connected to the A input of selector $36_{B6}$. The output of selector $36_{B6}$ is connected to both the B input of selector $36_{B1}$ and the input port $30_{BI}$ of director $20_1$, as indicated. The output of selector $36_{B12}$ is also connected to the A input of selector $36_{B7}$. The A inputs of selectors $36_{B2}$–$36_{B5}$ and $36_{B8}$–$36_{B11}$ are fed thereto from the B ports of disk drives $19_1$–$19_8$, respectively, as indicated. It is noted that the output of selector $36_{B12}$, in addition to being fed to the B input of selector $36_{B12}$ is connected to an expansion port $30_{EXBO}$ and that the A input of selector $36_{B12}$ is connected to an expansion port $30_{EXBI}$, for reasons to be discussed in more detail below in connection with FIGS. 4, 4A and 4B.

NORMAL OPERATING MODE

During the normal operating mode, port $30_A$ of director $20_0$ is coupled serially through disk drives $19_1$–$19_4$ of set $14_1$ via ports A of such disk drives $19_1$–$19_4$ and port $30_B$ of director $20_1$ is coupled serially through disk drives $19_5$–$19_8$ of set $14_1$ via ports B of such disk drives $19_5$–$19_8$. Such is accomplished by the control signals $C_{A1}$–$C_{A12}$ and $C_{B1}$–$C_{B12}$ which couple one of the A and B ports of the selectors coupled to the outputs of such selectors in the following

TABLE

| SELECTOR | INPUT PORT COUPLED TO SELECTOR OUTPUT |
|---|---|
| $36_{A1}$ | A |
| $36_{A2}$ | A |
| $36_{A3}$ | A |
| $36_{A4}$ | A |
| $36_{A5}$ | A |
| $36_{A6}$ | A |
| $36_{A7}$ | B |
| $36_{A8}$ | B |
| $36_{A9}$ | B |
| $36_{A10}$ | B |
| $36_{A11}$ | B |
| $36_{A12}$ | B |
| $36_{B1}$ | A |
| $36_{B2}$ | B |
| $36_{B3}$ | B |
| $36_{B4}$ | B |
| $36_{B5}$ | B |

TABLE-continued

| SELECTOR | INPUT PORT COUPLED TO SELECTOR OUTPUT |
|---|---|
| $36_{B6}$ | A |
| $36_{B7}$ | B |
| $36_{B8}$ | A |
| $36_{B9}$ | A |
| $36_{B10}$ | A |
| $36_{B11}$ | A |
| $36_{B12}$ | B |

In the event of a failure in one of the disk drives $19_1$–$19_8$, the control sections 40A and 40B are advised of such failure by the directors $20_0$ and $20_1$ via control lines $45_0$, $45_1$, respectively. For example, assume there is a failure in disk drive $19_3$. Once such a failure is detected during the normal operating mode, control section 40A changes the logic state on control line $C_{A4}$ to thereby de-couple input port A of selector $36_{A4}$ from its output and couples input port B of selector $36_{A4}$ to its output; thereby by-passing disk drive $19_3$ from the first fibre channel (i.e., the fibre channel through the input and output ports $30_{AI}$ and $30_{AO}$ of director $20_0$). In like manner, if there is a failure in disk drive $19_7$, once such a failure is detected during the normal operating mode, control section $40_B$ changes the logic state on control line $CB_{A10}$ to thereby de-couple input port A of selector $36_{B10}$ from its output and couples input port B of selector $36_{B10}$ to its output; thereby by-passing disk drive $19_7$ from the second fibre channel (i.e., the fibre channel through the input and output ports $30_{BI}$ and $30_{BO}$ of director $20_1$).

FAILURE OF ONE OF THE DIRECTORS $20_0$ or $20_1$

As noted above, during normal operation, director $20_0$ is coupled to the A ports of disk drives $19_1$–$19_4$ and director $20_1$ is coupled to the B ports of disk drives $19_5$–$19_8$. In the event of a failure in director $20_0$, director $20_0$ is de-coupled from disk drives $19_1$–$19_4$ and director $20_1$ is coupled to the B ports of disk drives $19_1$–$19_4$ in addition to remaining coupled to the B ports of disk drives $19_5$–$19_8$. Likewise, in the event of a failure in director $20_1$, director $20_1$ is de-coupled from disk drives $19_5$–$19_8$ and director $20_0$ is coupled to the A ports of disk drives $19_5$–$19_8$ in addition to remaining coupled to the A ports of disk drives $19_1$–$19_4$. Such is accomplished (i.e., removal of failed director $20_0$, for example) by the control signals $C_{A1}$–$C_{A12}$ and $C_{B1}$–$C_{B12}$ which couple one of the A and B ports of the selectors coupled to the outputs of such selectors in the following TABLE:

| SELECTOR | INPUT PORT COUPLED TO SELECTOR OUTPUT |
|---|---|
| $36_{A1}$ | A |
| $36_{A2}$ | A |
| $36_{A3}$ | A |
| $36_{A4}$ | A |
| $36_{A5}$ | A |
| $36_{A6}$ | A |
| $36_{A7}$ | B |
| $36_{A8}$ | A |
| $36_{A9}$ | A |
| $36_{A10}$ | A |
| $36_{A11}$ | A |
| $36_{A12}$ | B |
| $36_{B1}$ | B |
| $36_{B2}$ | B |
| $36_{B3}$ | B |
| $36_{B4}$ | B |
| $36_{B5}$ | B |

-continued

| SELECTOR | INPUT PORT COUPLED TO SELECTOR OUTPUT |
|---|---|
| $36_{B6}$ | A |
| $36_{B7}$ | B |
| $36_{B8}$ | B |
| $36_{B9}$ | B |
| $36_{B10}$ | B |
| $36_{B11}$ | B |
| $36_{B12}$ | B |

EXPANSION MODE

As described above in connection with FIG. 1, for each redundant FC network $25_1$–$25_4$ the A port of one of the rear-end directors thereof is coupled in the normal mode to one disk drive set and the A port of the other one of the rear-end directors thereof is coupled such set of disk drives. Thus, for example, considering redundant FC network $25_1$ shown more clearly in FIG. 2, during the normal operating mode, the A port of rear-end director $20_0$ and the A port of rear-end director $20_1$ are coupled to disk drive set $14_1$ through port by-passes $34_A$ and $34_B$, respectively, of port by-pass section $23_1$. Each one of the rear-end directors $20_0$–$20_{15}$ (FIG. 1) may, however, may be coupled to more than one disk drive set through the use of additional port by-passes. For example, referring to FIG. 4 and considering port A of the rear-end directors $20_0$ and $20_1$, an additional disk drive set $14'_1$ is shown coupled to the A ports of rear-end directors $20_0$ and $20_1$ through FC port by-passes $34'_A$ and $34'_B$, respectively, as shown. It is first noted that the additional FC port by-passes $34'_A$ and $34'_B$ are identical in construction to FC port by-passes $34_A$ and $34_B$ shown in FIG. 3. Thus, referring also to FIGS. 4 and 4A, the same numerical designation is used for the elements in FC port by-pass $34'_A$ as was used in FC port by-pass $34_A$ except that the elements in FC port by-pass $34'_A$ have a prime (') numerical designation. It is next noted in FIG. 4, that the A port of director $20_0$ is connected to the A ports of the disk drives $19_1$–$19_8$, $19'_1$–$19'_8$ in both disk drive sets $14_1$ and $14'_1$ through FC port by-passes $34_A$ and $34'_A$, respectively, and that the A port of director $20_1$ is connected to the B ports of the disk drives $19_1$–$19_8$ and $19'_1$–$19'_8$, respectively, in both disk drive sets $14_1$ and $14'_1$, respectively, through FC port by-passes $34_B$ and $34'_B$, respectively. More specifically, and referring also to FIG. 4A, the output of port A of director $20_1$ is coupled to port $30_{AI}$ of FC port by-pass $34_A$ and the input of port A of director $20_0$ is coupled to port $30_{AO}$. The output of selector $36_{A6}$ is coupled to the B input of selector $36_{A1}$ of port A by-pass $34_A$, and to port $30_{AO}$. Port $30_{AI}$ is coupled to the A input of selector $36_{A1}$ of the port A by-pass $34_A$. The details of the port A by-pass have been described above in connection with FIG. 3. The output of selector $36_{A11}$ is connected, through expansion port $30_{EXAO}$ to A input of selector $36'_{A1}$ of port A by-pass $34'_A$ and the output of selector $36'_{A6}$ of selector $34'_A$ is connected to the B input of selector $36'_{A1}$ and through port $30'_{AO}$, to the A input of selector $36'_{A12}$ of port A by-pass $34'_A$. Thus, port A by-pass $34_A$ is adapted to service disk drive set 14 and, if expansion is desired, the additional port A by-pass $34'_A$ is adapted to service the additional disk drive set $14'_1$.

Referring now also to FIG. 4B, the port A by-pass $34_A$ and the additional port A by-pass $34'_A$ are shown in more detail. Thus, the FC port by-pass $34_A$ includes selectors $36_{A1}$–$36_{A12}$ and a control section $40_A$. Each one of the selectors $36_{A1}$–$36_{A12}$ has a pair of input ports (i.e., an A input and a B input) and an output port, one of the input ports A or B being coupled to the output port selectively in accordance with a control signal $C_{A1}$–$C_{A12}$, respectively, fed thereto, as indicated, by the control section $40_A$. It is also noted that input port $30_{AI}$ is coupled to port A of director $20_0$ and the output of selector $36_{A6}$ of by-pass $34_A$ is coupled to port $30_{AO}$, as in FIG. 4A.

During the normal mode of operation, port $30_A$ of director $20_0$ is coupled serially through disk drives $19_1$–$19_4$ of set $14_1$ via ports A of such disk drives $19_1$–$19_4$ and through disk drives $19'_1$–$19'_4$ and then back to port $30'_{AO}$. Such is accomplished by the control signals $C_{A1}$–$C_{A12}$ and $C'_{A1}$–$C'_{A12}$ which couple one of the A and B ports of the selectors coupled to the outputs of such selectors in the following

TABLE

| SELECTOR | INPUT PORT COUPLED TO SELECTOR OUTPUT |
|---|---|
| $36_{A1}$ | A |
| $36_{A2}$ | A |
| $36_{A3}$ | A |
| $36_{A4}$ | A |
| $36_{A5}$ | A |
| $36_{A6}$ | A |
| $36_{A7}$ | B |
| $36_{A8}$ | B |
| $36_{A9}$ | B |
| $36_{A10}$ | B |
| $36_{A11}$ | B |
| $36_{A12}$ | A |
| $36'_{A1}$ | A |
| $36'_{A2}$ | A |
| $36'_{A3}$ | A |
| $36'_{A4}$ | A |
| $36'_{A5}$ | A |
| $36'_{A6}$ | B |
| $36'_{A7}$ | B |
| $36'_{A8}$ | B |
| $36'_{A9}$ | B |
| $36'_{A10}$ | B |
| $36'_{A11}$ | B |
| $36'_{A12}$ | B |

In the event of a failure in director $20_1$, director $20_0$ is coupled to the A ports of disk drives $19'_1$–$19'_8$ and $19_1$–$19_8$. Such is accomplished by the control signals $C_{A1}$–$C_{A12}$ and $C'_{A1}$–$C'_{A12}$ which couple one of the A and B ports of the selectors coupled to the outputs of such selectors in the following TABLE:

| SELECTOR | INPUT PORT COUPLED TO SELECTOR OUTPUT |
|---|---|
| $36_{A1}$ | A |
| $36_{A2}$ | A |
| $36_{A3}$ | A |
| $36_{A4}$ | A |
| $36_{A5}$ | A |
| $36_{A6}$ | A |
| $36_{A7}$ | B |
| $36_{A8}$ | A |
| $36_{A9}$ | A |
| $36_{A10}$ | A |
| $36_{A11}$ | A |
| $36_{A12}$ | A |
| $36'_{A1}$ | A |
| $36'_{A2}$ | A |
| $36'_{A3}$ | A |
| $36'_{A4}$ | A |
| $36'_{A5}$ | A |
| $36'_{A6}$ | A |
| $36'_{A7}$ | B |

-continued

| SELECTOR | INPUT PORT COUPLED TO SELECTOR OUTPUT |
|---|---|
| $36'_{A8}$ | A |
| $36'_{A9}$ | A |
| $36'_{A10}$ | A |
| $36'_{A11}$ | A |
| $36'_{A12}$ | B |

It is understood that appropriate control signals are produced by FC port by-passes $34_B$, $34'_B$ (FIGS. 4. 4A and 4B) to de-couple failed director $20_1$ from the B ports of disk drives $19_4-19_8$ and $19'_4-19'_8$.

CONTRACTION MODE

Referring now to FIGS. 5, and 5A, an arrangement is shown where the disk drive set $14_1$ in bank 14 (FIG. 1) has 24 disk drives $19''_1-19''_{24}$ instead of the 8 disk drive set $14_1-14_8$ discussed above. Further, a redundant FC network $25''_1$ includes, in addition to the rear-end directors $20_0$ and $20_1$ described above in connection with redundant FC network $25_1$ (FIG. 1), a pair of additional rear-end directors $20''_0$ and $20''_1$. Director $20''_1$ is coupled to busses TL and BH (FIG. 1) and director $20''_1$, is coupled to busses TH and BL (FIG. 1). The A port of director $20''_0$ is coupled to the A ports of the disk drives $19''_1-19''_{24}$ in disk drive set $14''_1$ through port A by-pass $34''_A$ of port by-pass section $23''_1$ and the B port of director $20''_0$ is coupled to the A ports of the disk drives $19''_1-19''_{24}$ in disk drive set $14''_2$ through port A by-pass $34'_A$ of port by-pass section $23''_2$. The A port of director $20''_1$, is coupled to the B ports of the disk drives $19''_1-19''_{24}$ in disk drive set $14''_1$ through port B by-pass $34''_A$ of port by-pass section $23''_1$ and the B port of director $20''_1$ is coupled to the B ports of the disk drives $19''_1-19''_{24}$ in disk drive set $14''_2$ through port B by-pass $34''_B$ of port by-pass section $23''_2$. In a manner similar to the redundant FC network $25_1$ described above in connection with FIGS. 1 and 2, the A port of director $20_0$ is coupled to the A ports of the disk drives $19''_1-19''_{24}$ in disk drive set $14''_1$ through port A by-pass $34-_A$ of port by-pass section $23''_1$, and the B port of director $20_0$ is coupled to the A ports of the disk drives $19''_1-19''_{24}$ in disk drive set $14''_2$ through port A by-pass $34''_A$ of port by-pass section $23''_2$. Likewise, the A port of director $20_1$ is coupled to the B ports of the disk drives $19''_1-19''_{24}$ in disk drive set $14''_1$ through port A by-pass $34''_A$ of port by-pass section $23''_1$ and the B port of director $20_1$ is coupled to the B ports of the disk drives $19''_1-19''_{24}$ in disk drive set $14''_2$ through port B by-pass $34''_B$ of port by-pass section $23''_2$.

Thus, here each set of disk drives $14''_1$ and $14''_2$ may be coupled to four rear-end directors $20_0$, $20_1$, $20''_0$, $20''_1$. The connections of rear-end directors $20_0$ and $20_1$ is at the input/output ports $30''_A$, $30''_B$ of the port A by-passes $34''_A$, $34''_B$ of port by-pass sections $23''_1$ and $23''_2$, respectively, in a manner similar to that described above in connection with FIG. 2. The connections of rear-end directors $20''_0$ and $20''_1$ is at the expansion input/output ports $30''_{EXA}$, $30''_{EXB}$ of the port A by-passes $34''_A$, $34''_B$ of port by-pass sections $23''_1$ and $23''_2$, respectively, as shown more clearly in FIGS. 5A and 5B.

Figure 5C:
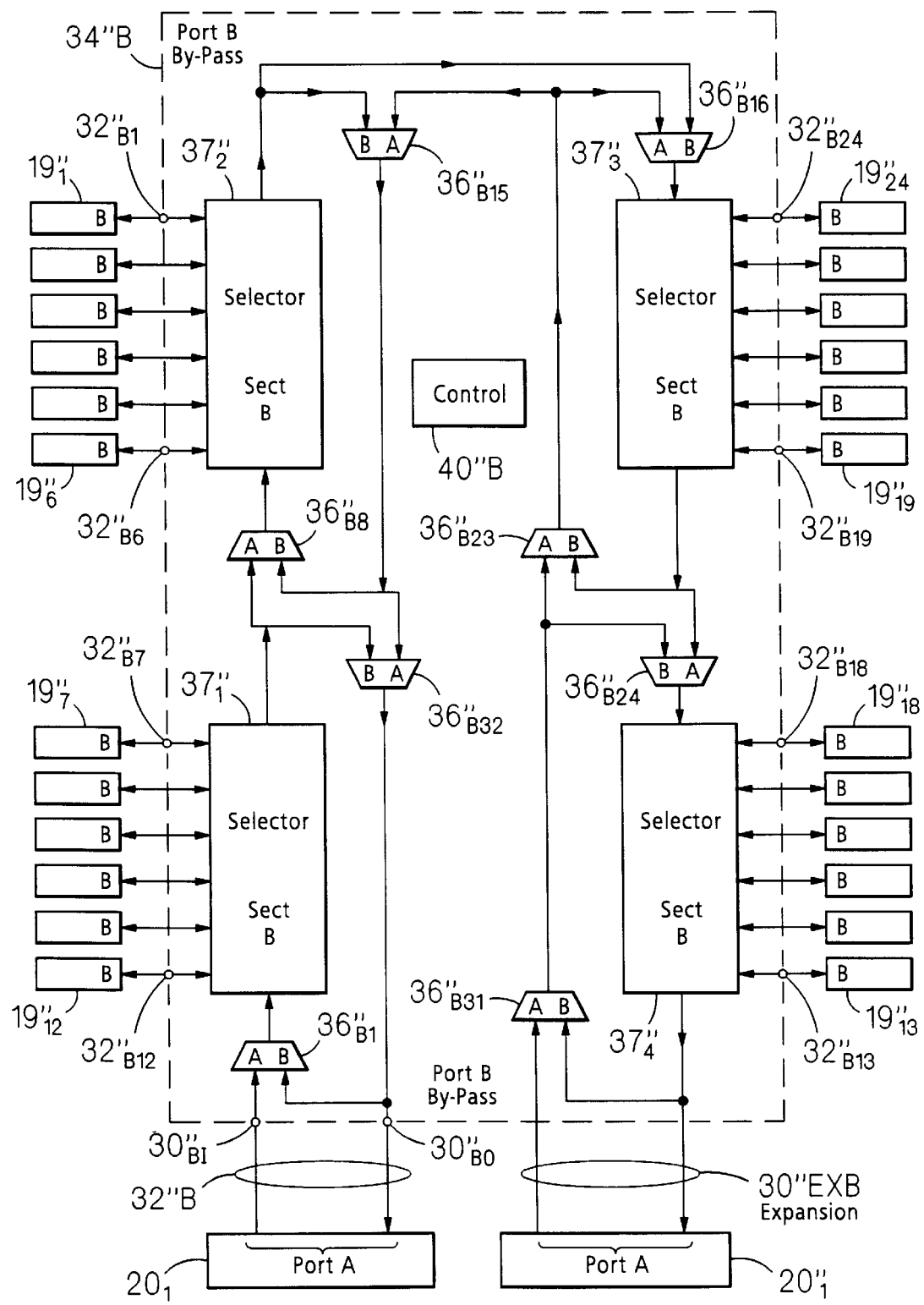
FIGS. 5C–5G are diagrams of the network of FIGS. 5, 5A and 5B configured in a number of contracted configurations according to the invention.

It is first noted that each of the port A and port B by-passes $34''_A$ and $34''_B$ is identical in construction. An exemplary one thereof, here port B by-pass $34''_B$ is shown in detail in FIGS. 5B and 5C. More particularly, and referring to FIGS. 5B and 5C, the disk drives $19''_1-19''_{24}$ are arranged in four sets, each set being coupled to a corresponding one of four selector sections $37''_1-37''_4$, as indicated. Thus, disk drives $19''_7-19''_{12}$ are coupled to selector section $37''_1$, disk drives $19''_1-19''_6$ are coupled to selector section $37''_2$, disk drives $19''_{19}-19''_{24}$ are coupled to selector section $37''_3$, and disk drives $19''_{13}-19''_{18}$ are coupled to selector section $37''_4$, as indicated. The selectors: $36''_{B2}-36''_{B7}$; $36''_{B9}-36''_{B14}$; $36''_{B17}-36''_{B22}$; and, $36''_{B25}-36''_{B30}$, in the sections $37''_1$; $37''_2$; $37''_3$; and $37''_4$, respectively, are controlled by control signals fed to the selectors therein by control $40''_B$ in a manner similar to that described above in FIG. 3 in connection with controls $40_A$ and $40_B$. Referring also to FIG. 5C, the port B by-pass $34''$ is shown to include, in addition to the selectors in the four selectors sections $37''_1-37''_4$, described above in connection with FIG. 5B, selectors $36''_{B1}$, $36''_{B8}$, $36''_{B15}$, $36''_{16}$, $36''_{23}$, $36''_{B24}$, $36''_{B31}$, and $36''_{B32}$, arranged as shown.

Referring again also to FIGS. 5 and 5A, and the exemplary port B by-pass $34''_B$, it is noted that port A of rear-end director $20_1$ is connected to ports $30_{BI}$ and $30''_{BO}$ of input/output port $30''_B$ and that port A of rear-end director $20''_1$ is connected to ports $30_{EXI}$ and $30''_{EXO}$ of expansion port $30''_{EXB}$. This arrangement is useful where one has a system with 24 disk dives in each set and then wants to reduce the number of disk drives to either 18, or 12, or 6 disk drives.

Figure 5D:
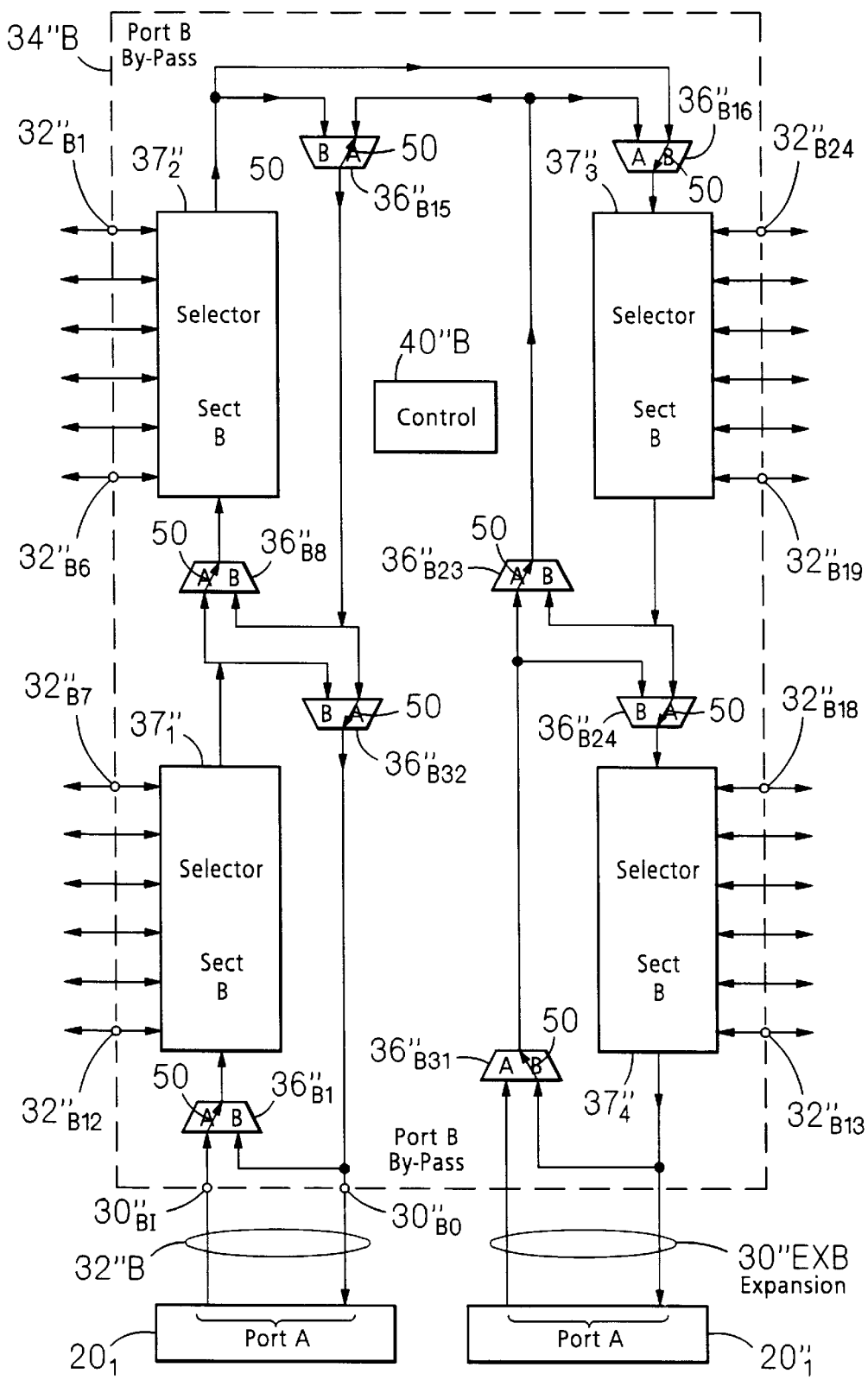

More particularly, and referring also to FIG. 5D, rear-end director $20_1$ a configurations is shown where director $20_1$ is coupled to the B ports of all 24 disk drives $19''_1-19''_{24}$ in set $14''_1$ and director $20''_1$ is not coupled to any of the 24 disk drives $19''_1-19''_{24}$ in set $14''_1$. Thus, the output of selector $36''_{B1}$ is coupled to its input port A (as indicated by the arrows 50), the output of selector $36''_{B8}$ is coupled to its A input port, the output of selector $36''_{B15}$ is coupled to its A port, the output of selector $36''_{16}$ is coupled to its B port, the output of selector $36''_{23}$ is coupled to its A port, the output of selector $36''_{B24}$ is coupled to its B port, the output of selector $36''_{B31}$ is coupled to its B port, and the output of selector $36''_{B32}$ is coupled to its A port.

Figure 5E:
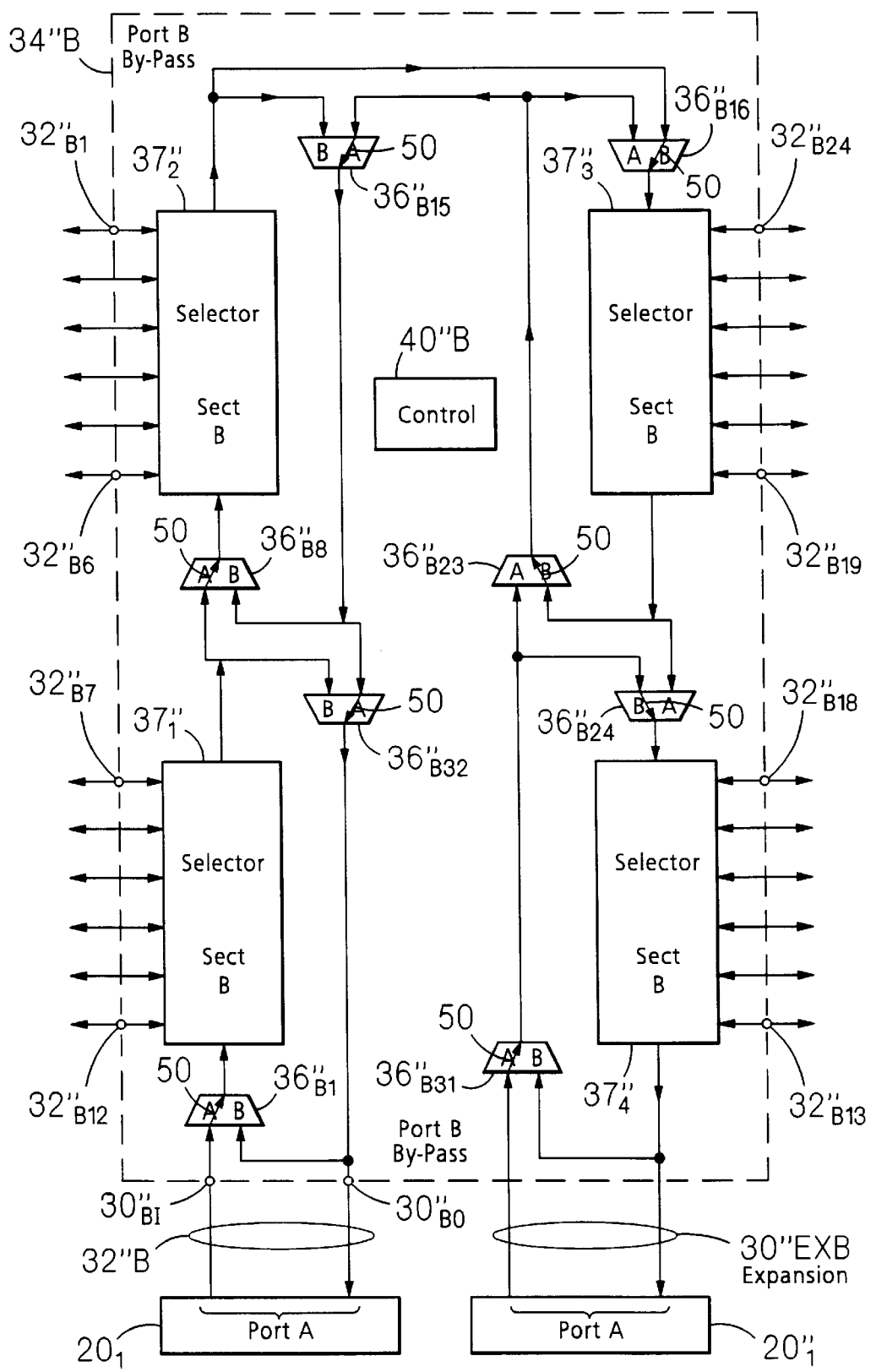

Thus, the A port of director $20_1$ connected to the port $30''_{BI}$ passes through selector $36''_{B1}$ to the input of selector section $37''_1$. The output of selector section $37''_1$ then passes successively through: the selector $36''_{B8}$; selector section $37''_2$; selector $36''_{B16}$; selector section $37''_3$; selector $36''_{B24}$; selector section $37''_4$; selector $36''_{B31}$; selector $36''_{B23}$; selector $36''_{B15}$; selector $36''_{B32}$ then to port $30''_{BO}$ and back to the A port of director $20_1$. It is noted that director $20''_1$ is by-passed and not connected to the selector sections $37''_1-37''_2$ and hence not connectable to the disk drives connected to such selector sections $37''_1-37''_2$ If the user wishes to reduce the number of disk drives coupled to director $20_1$ from 24 to 18 with director $20''_1$ coupled to the other 6 disk drives, such a configuration is shown in FIG. 5E. Thus, the output of selector $36''_{B1}$ remains coupled to its input port A (as indicated by the arrows 50), the output of selector $36''_{B8}$ remains coupled to its A input port, the output of selector $36''_{B15}$ remains coupled to its A port, the output of selector $36''_{16}$ remains coupled to its B port, the output of selector $36''_{23}$ switches to its B port, the output of selector $36''_{B24}$ switches to its A port, the output of selector $36''_{B31}$ switches to its A port, and the output of selector $36''_{B32}$ remains coupled to its A port.

Thus, the A port of director $20_1$ coupled to port $30''_{BI}$ is then coupled through selector $36''_{B1}$ to the input of selector section $37''_1$. The output of selector section $37''_1$ then passes successively through: the selector $36''_{B8}$; selector section $37''_2$; selector $36''_{B16}$; selector section $37''_3$; selector $36''_{B23}$; selector $36''_{B15}$; selector $36''_{B32}$ and then to port $30''_{BO}$ and back to the A port of director $20_1$. The A port of director $20''_1$ is connected through selector $36''_{B31}$ and through selector $36''_{B24}$ to selector section $37''_4$ and the back to the A port of selector $20''_1$.

Figure 5F:
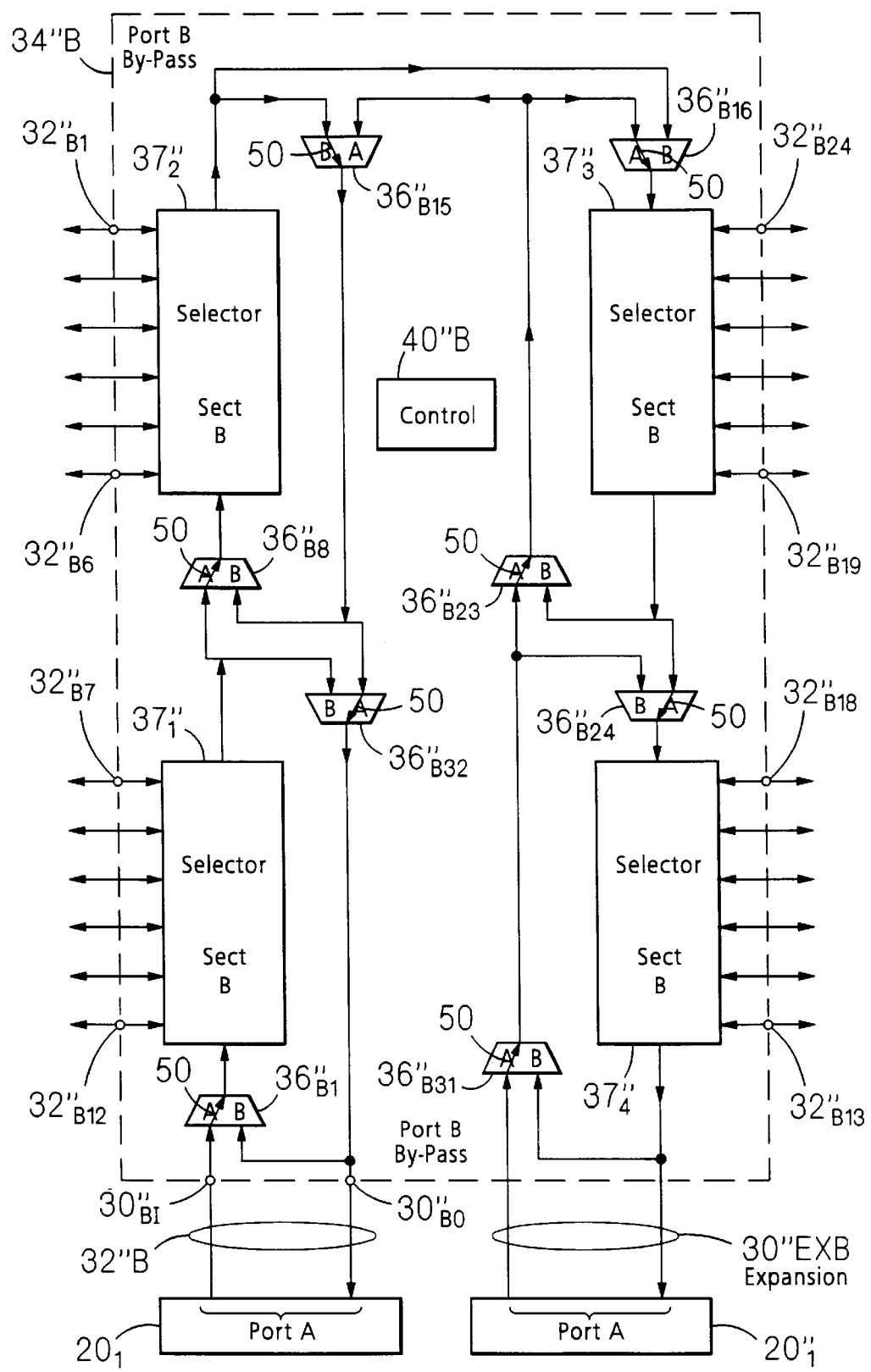

If the user wishes to reduce the number of disk drives coupled to director $20''_1$ from 18 to 12 with the director $20''_1$ being coupled to the other 12 disk drives, such a configuration is shown in FIG. 5F. Thus, the output of selector $36''_{B1}$ remains coupled to its input port A (as indicated by the arrows 50), the output of selector $36''_{B8}$ remains coupled to its A port, the output of selector $36''_{B15}$ switches to its B port, the output of selector $36''_{16}$ switches to its A port, the output of selector $36''_{23}$ switches to its A port, the output of selector $36''_{B24}$ switches to its B port, the output of selector $36''_{B31}$ remains at its A port, and the output of selector $36''_{B32}$ remains at its B port.

Thus, the A port of director $20_1$ coupled to port $30''_{BI}$ is coupled through selector $36''_{B1}$ to the input of selector section $37''_1$. The output of selector section $37''_1$ then passes successively through: the selector $36''_{B8}$; selector section $37''_2$; selector $36''_{B15}$; selector $36''_{B32}$ and then to port $30''_{BO}$ and back to the A port of director $20_1$. The A port of director $20''_1$, connected through selector $36''_{B31}$ is coupled through selector $36''_{B31}$ then through selector $36''_{B23}$; selector $36_{B16}$; selector section $37''_3$, then through selector $36''_{B24}$, selector section $37''_4$ and the back to the A port of selector $20''_1$.

Figure 5G:
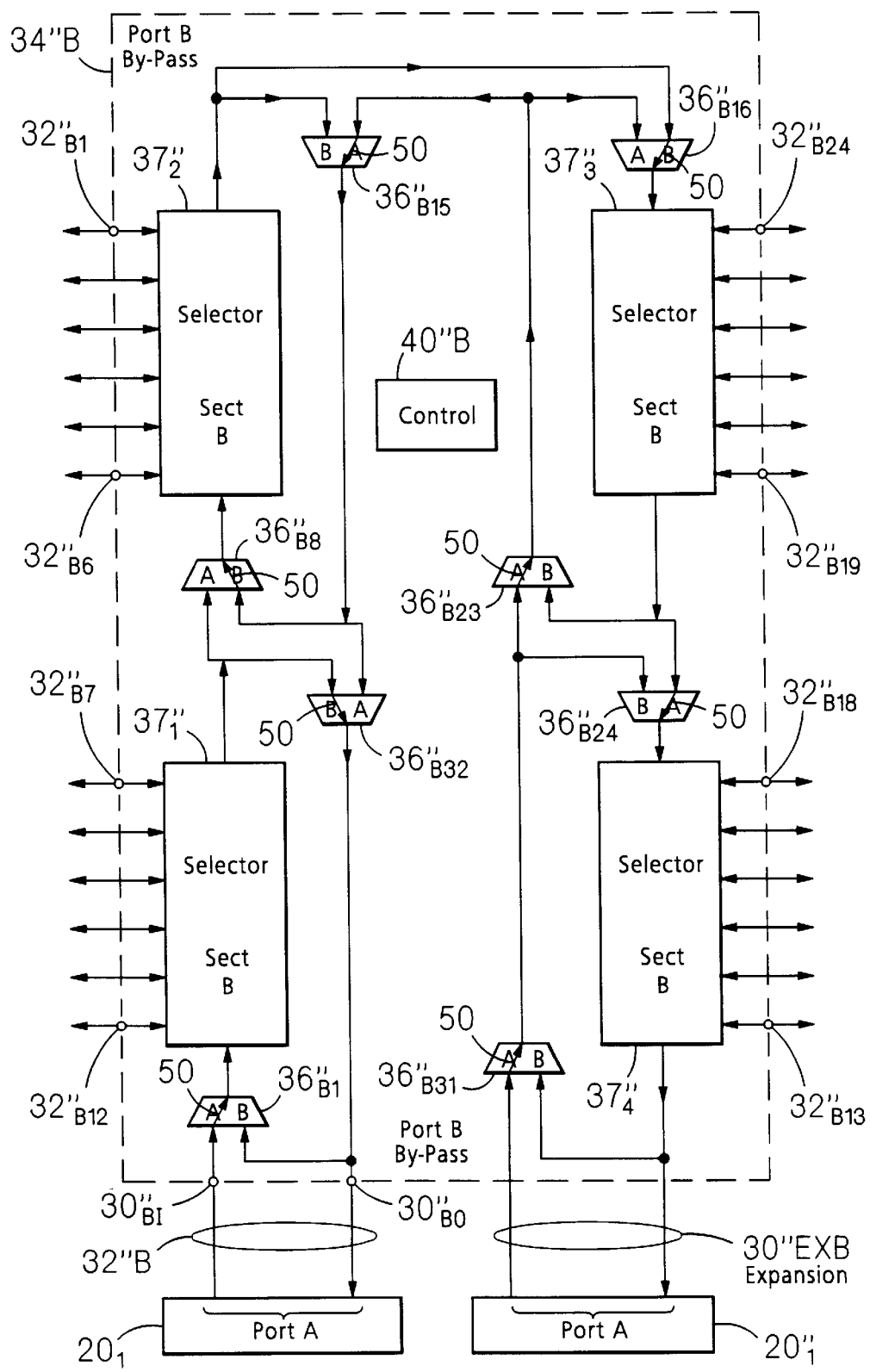

If the user wishes to reduce the number of disk drives coupled to director $20_1$ from 12 to 6 with the director $20''_1$ being coupled to the other 18 disk drives, such a configuration is shown in FIG. 5G. Thus, the output of selector $36''_{B1}$ remains coupled to its input port A (as indicated by the arrows 50), the output of selector $36''_{B8}$ is switched to its B port, the output of selector $36''_{B15}$ is switched to its B port, the output of selector $36''_{16}$ is switched to its B port, the output of selector $36''_{23}$ remains at its A port, the output of selector $36''_{B24}$ remains at its B port, the output of selector $36''_{B31}$ remains at its A port, and the output of selector $36''_{B32}$ is switched to its A port.

Thus, the A port of director $20_1$ coupled to port $30''_{BI}$ is coupled through selector $36''_{B1}$ to the input of selector section $37''_1$. The output of selector section $37''_1$ then passes through selector $36''_{B32}$ and then to port $30''_{BO}$ and back to the A port of director $20_1$. The A port of director $20''_1$. connected through selector $36''_{B31}$ is coupled through selector $36''_{B31}$ then through successively through selector $36''_{B23}$; selector $36_{B15}$, selector section $37_2$, selector $36_{B16}$, selector section $37''_3$, selector $36_{B24}$, to selector section $37''_3$, then through selector $36''_{B24}$ to selector section $37''_4$ and the back to the A port of selector $20''_1$.

Other embodiments are within the spirit and scope of the appended claims.

What is claimed is:

1. A fibre channel by-pass, comprising:
   a pair of input/output ports;
   a plurality of selector sections each one being coupled to a set of disk drives through fibre channel links, each one of the sections having a plurality of selectors and an input and an output serially coupled to the set of disk drives coupled thereto selectively in accordance with control signals fed to the plurality of selectors;
   a plurality of input selectors, each one having a pair of inputs and an output, such output being coupled to the input of a corresponding one of the plurality of selector sections; and
   a plurality of output selectors, each one having a pair of inputs and an output, a first one of the pair of inputs being coupled to the output of a corresponding one of the plurality of selector sections, each one of the outputs being coupled to a first one of the pair of inputs of the one of the selectors having the output thereof coupled to a first input of the one of the selectors having the output thereof coupled to such corresponding one of the selector sections;
   wherein the outputs of the selector sections except for a last one thereof being coupled to a second one of the pair of inputs of one of the input selectors;
   the pair inputs of a first one of the input selectors being coupled to a first one of the pair of input/output ports; and
   the pair inputs of the last one of the output selectors is coupled to a second one of the pair of input/output ports.

2. The fibre channel by-pass recited in claim 1 wherein a second one of the pair of inputs of each one of the plurality of output selectors except for a last one thereof is coupled to the output of another one of the plurality of output selectors.

* * * * *